(12) United States Patent
Kobayashi et al.

(10) Patent No.: US 10,128,694 B2
(45) Date of Patent: *Nov. 13, 2018

(54) POWER STORAGE APPARATUS

(71) Applicant: VOLVO TRUCK CORPORATION, Gothenburg (SE)

(72) Inventors: Shigemi Kobayashi, Higashimatsuyama (JP); Masayuki Nakane, Tsurugashima (JP); Takayuki Tsuchiya, Saitama (JP)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/267,143

(22) Filed: Sep. 16, 2016

(65) Prior Publication Data

US 2017/0005506 A1    Jan. 5, 2017

Related U.S. Application Data

(63) Continuation of application No. 13/501,122, filed as application No. PCT/JP2010/068227 on Oct. 8, 2010, now Pat. No. 9,496,721.

(30) Foreign Application Priority Data

Oct. 14, 2009   (JP) .................................. 2009-237051

(51) Int. Cl.
*H02J 7/00* (2006.01)
*H02J 50/20* (2016.01)
(Continued)

(52) U.S. Cl.
CPC ............. *H02J 50/20* (2016.02); *B60L 11/005* (2013.01); *B60L 11/182* (2013.01);
(Continued)

(58) Field of Classification Search
USPC ........................................................ 320/108
See application file for complete search history.

(56) References Cited

U.S. PATENT DOCUMENTS

| 5,633,577 A | 5/1997 | Matsumae et al. |
| 6,016,046 A | 1/2000 | Kaite et al. |
| (Continued) | | |

FOREIGN PATENT DOCUMENTS

| EP | 1202371 A1 | 5/2002 |
| JP | 9-121481 A | 5/1997 |
| (Continued) | | |

OTHER PUBLICATIONS

International Search Report and Written Opinion in International Application No. PCT/JP2010/068227 dated Jan. 11, 2011.
(Continued)

*Primary Examiner* — Samuel Berhanu
(74) *Attorney, Agent, or Firm* — Hauptman Ham, LLP

(57) ABSTRACT

A storage apparatus includes a plurality of storage cells connected in series. Each storage cell comprises a storage element that stores a charge, a container that houses the storage element, a reception antenna capable of receiving power transmitted from a transmission antenna of a feeding facility provided in a wireless power transfer system, and a charging control circuit that charges the storage element using the power received by the reception antenna. The plurality of storage cells are charged concurrently and wirelessly, and therefore charging can be performed on all of the storage cells without overcharging or undercharging.

6 Claims, 26 Drawing Sheets

(51) Int. Cl.
*H02J 50/12* (2016.01)
*B60L 11/18* (2006.01)
*H01G 9/00* (2006.01)
*H01G 9/26* (2006.01)
*H01G 11/10* (2013.01)
*H02J 5/00* (2016.01)
*H02J 17/00* (2006.01)
*B60L 11/00* (2006.01)
*B60R 16/033* (2006.01)
*H01F 27/28* (2006.01)
*H02J 7/02* (2016.01)

(52) U.S. Cl.
CPC ......... *B60L 11/185* (2013.01); *B60L 11/1812* (2013.01); *B60L 11/1861* (2013.01); *B60R 16/033* (2013.01); *H01F 27/2804* (2013.01); *H01G 9/155* (2013.01); *H01G 9/26* (2013.01); *H01G 11/10* (2013.01); *H02J 5/005* (2013.01); *H02J 7/0014* (2013.01); *H02J 7/0042* (2013.01); *H02J 7/0052* (2013.01); *H02J 7/025* (2013.01); *H02J 17/00* (2013.01); *H02J 50/12* (2016.02); *Y02E 60/13* (2013.01); *Y02T 10/7005* (2013.01); *Y02T 10/705* (2013.01); *Y02T 10/7022* (2013.01); *Y02T 10/7044* (2013.01); *Y02T 10/7055* (2013.01); *Y02T 10/7072* (2013.01); *Y02T 90/121* (2013.01); *Y02T 90/122* (2013.01); *Y02T 90/127* (2013.01); *Y02T 90/128* (2013.01); *Y02T 90/14* (2013.01)

(56) References Cited

U.S. PATENT DOCUMENTS 6,154,005 A * 11/2000 Hyogo ................. B60L 11/182
  320/108
6,163,131 A * 12/2000 Gartstein ................ H02J 7/025
  320/118
6,743,546 B1   6/2004 Kaneda et al.
2007/0222681 A1   9/2007 Greene et al.
2009/0243541 A1  10/2009 Jeong et al.
2010/0225271 A1 *  9/2010 Oyobe ................... B60L 5/005
  320/108
2011/0089897 A1 *  4/2011 Zhang ................... H02J 7/0016
  320/116
2011/0151314 A1 *  6/2011 Ogawa ................ H01M 2/1077
  429/158

FOREIGN PATENT DOCUMENTS

| | | | |
|---|---|---|---|
| JP | 10-14003 | A | 1/1998 |
| JP | 10-257697 | A | 9/1998 |
| JP | 2002-135976 | A | 5/2002 |
| JP | 2002-152996 | A | 5/2002 |
| JP | 2002-281685 | A | 9/2002 |
| JP | 2004-274972 | A | 9/2004 |
| JP | 2005-108485 | A | 4/2005 |
| JP | 2006-121791 | A | 5/2006 |
| JP | 2006-174676 | A | 6/2006 |
| JP | 2006-296179 | A | 10/2006 |
| JP | 3985390 | B2 | 10/2007 |
| JP | 2007-294274 | A | 11/2007 |
| JP | 2008-54424 | A | 3/2008 |
| JP | 2008-61364 | A | 3/2008 |
| JP | 2008-300593 | A | 12/2008 |
| JP | 2009-106136 | A | 5/2009 |
| WO | 97/42695 | A1 | 11/1997 |
| WO | 2007/108819 | A1 | 9/2007 |
| WO | 2009/054221 | A1 | 4/2009 |

OTHER PUBLICATIONS

A. Kurs et al., "Wireless Power Transfer via Strongly Coupled Magnetic Resonances", Science vol. 317, pp. 33-86, published on Jul. 6, 2007.
Office Action in JP Application No. 2011-536202, dated Jul. 9, 2013.
Extended European Search Report in EP application No. 10823491.5, dated Mar. 20, 2014.
Office Action in JP Application No. 2011-536202, dated Feb. 25, 2014.

* cited by examiner

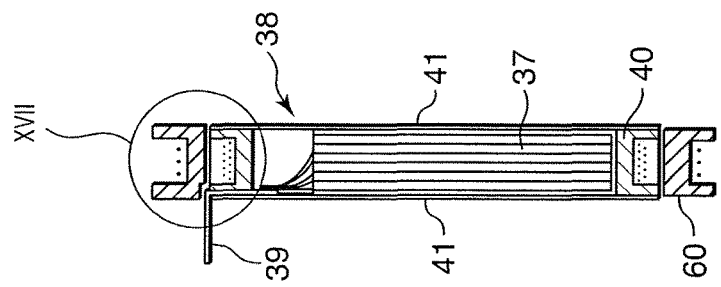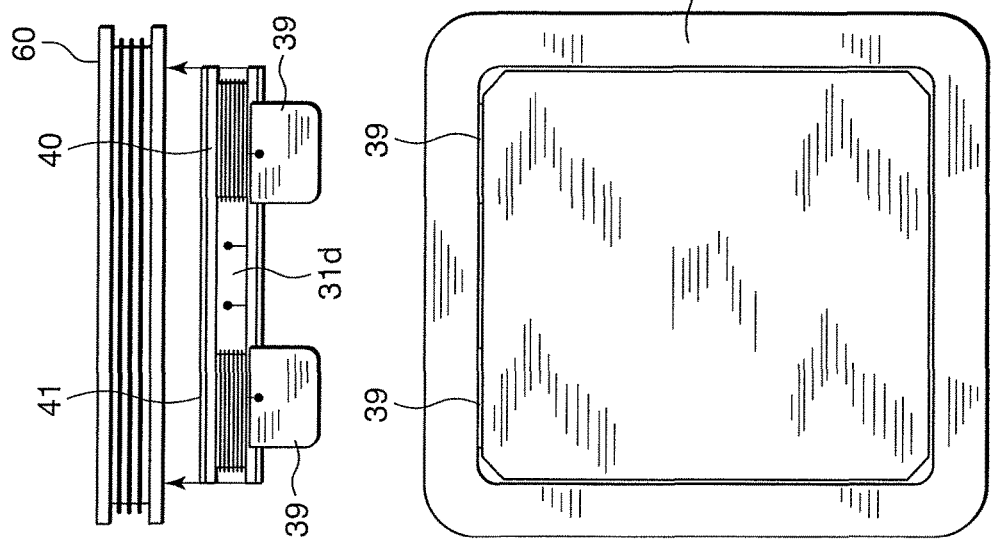
FIG. 16B
FIG. 16C
FIG. 16A

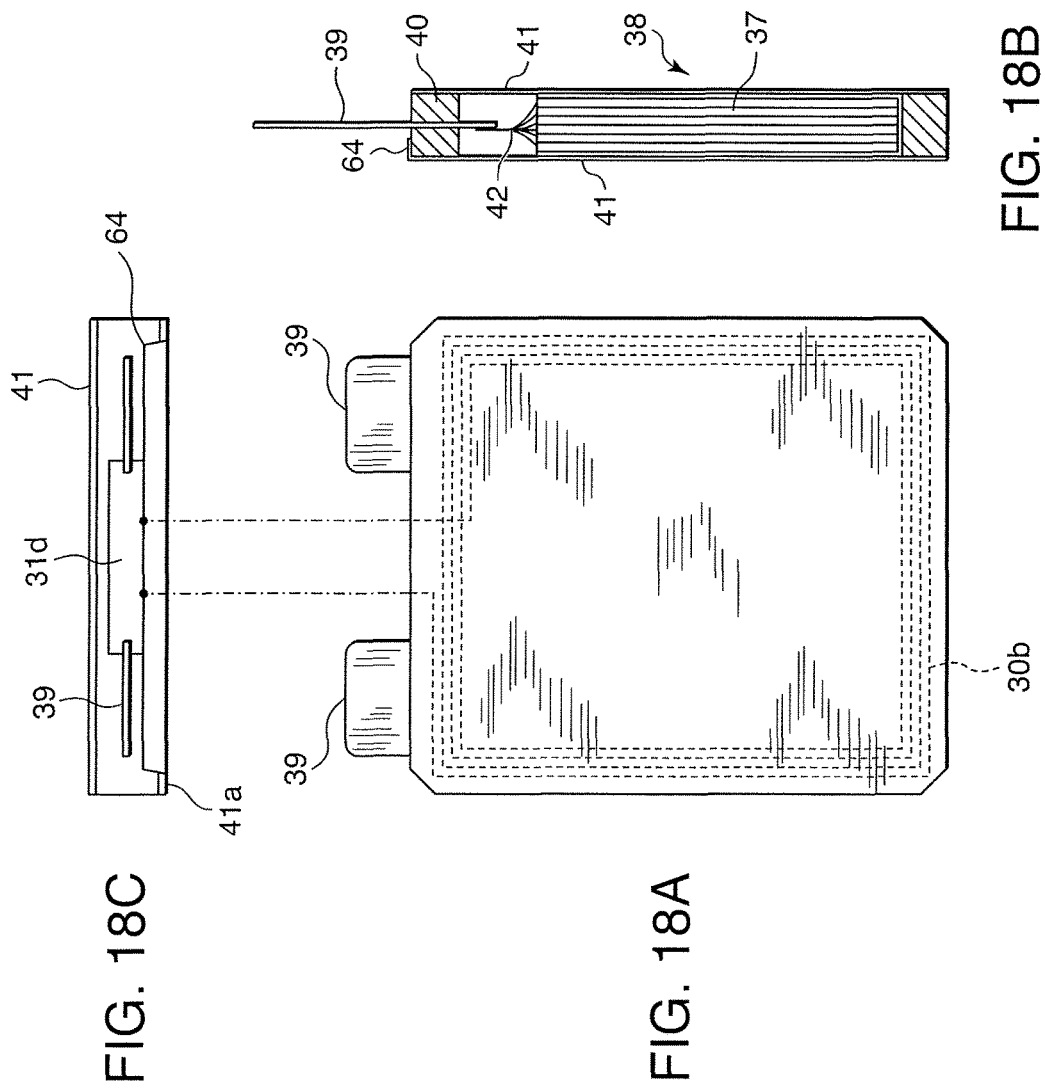

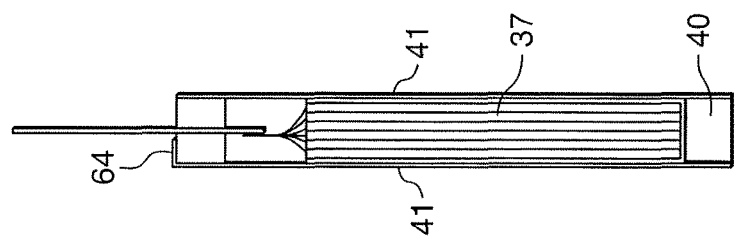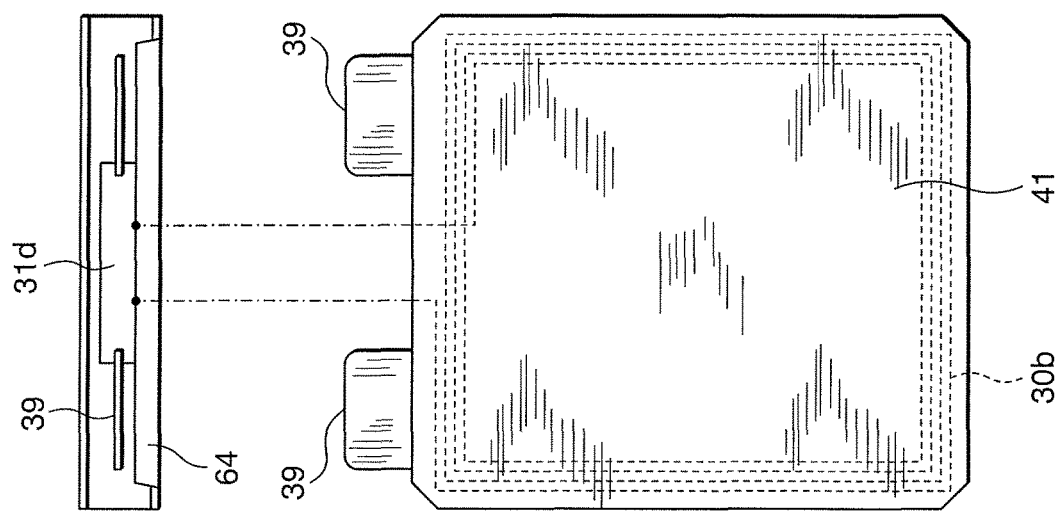

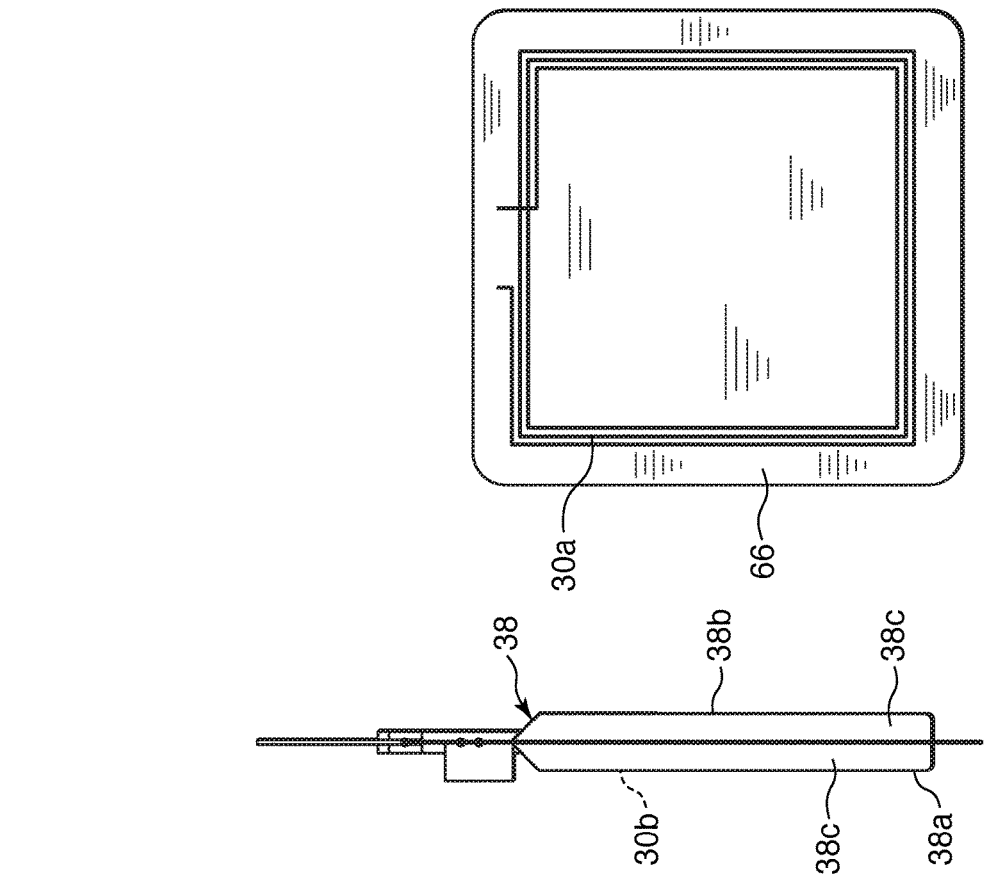
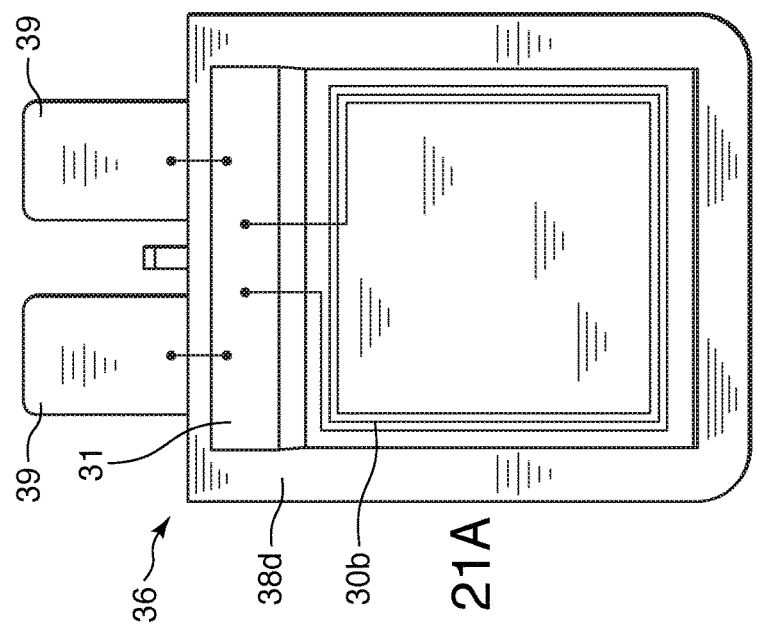
FIG. 21A   FIG. 21B   FIG. 21C   FIG. 22

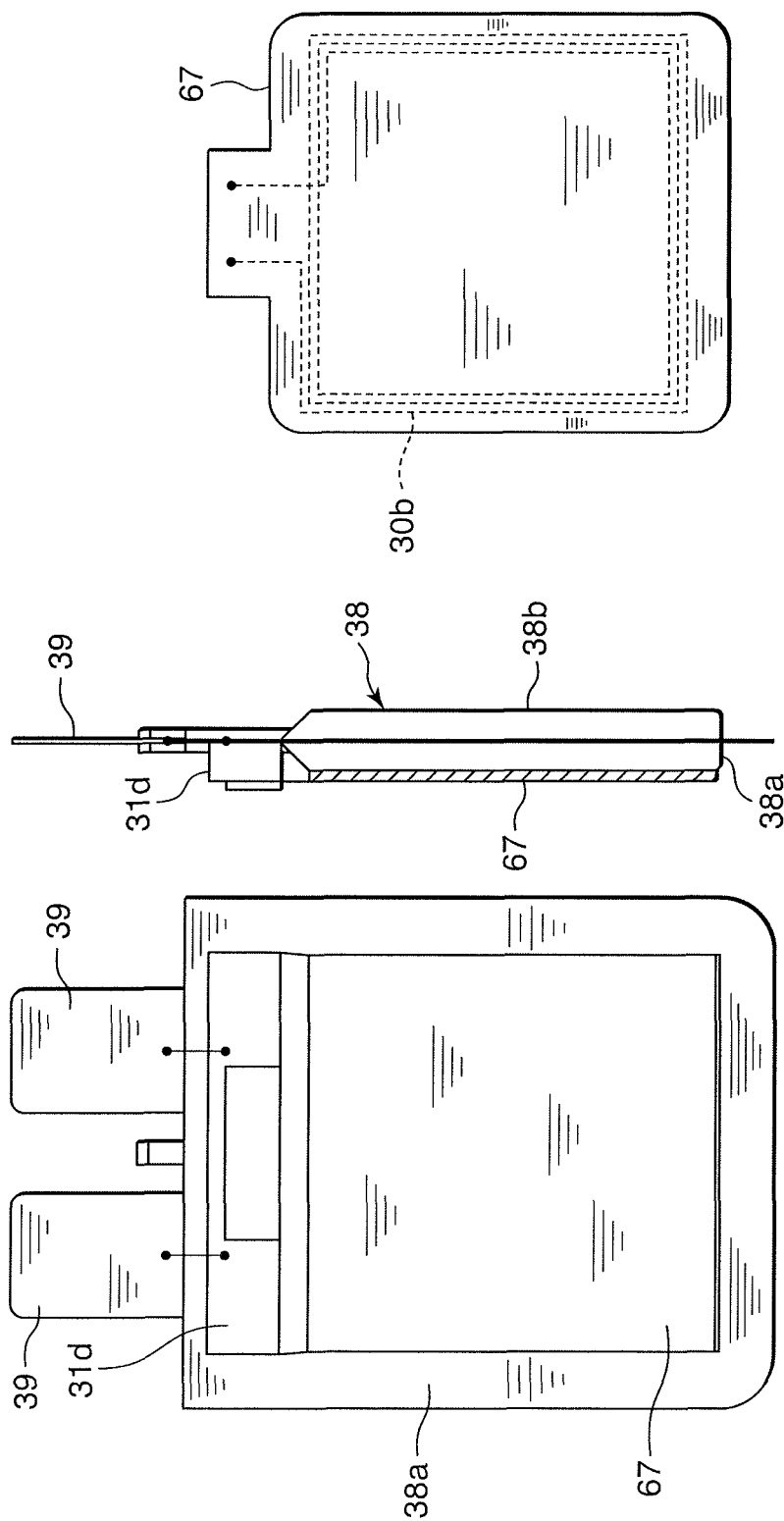

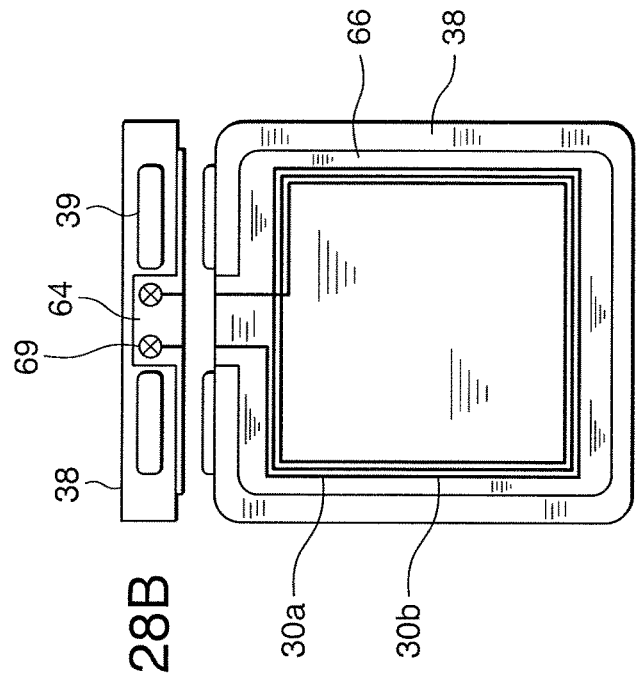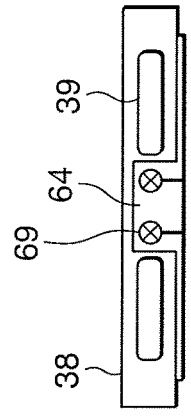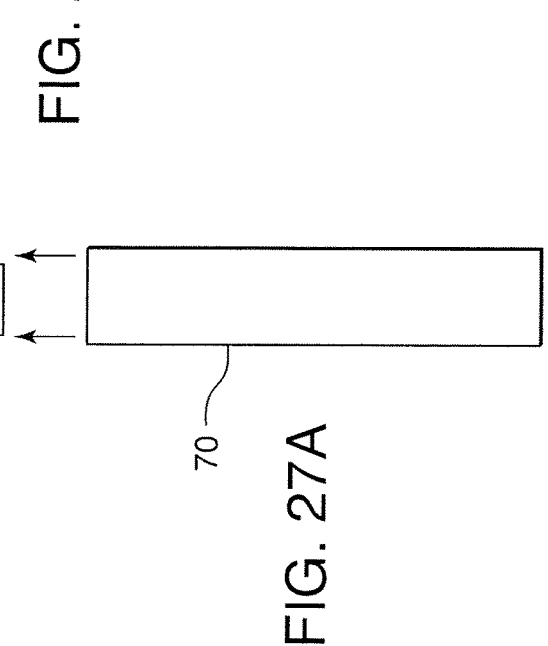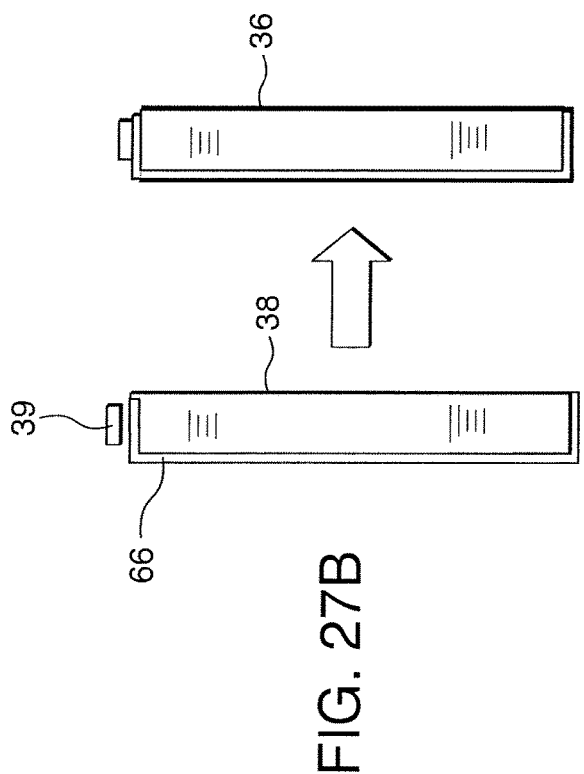
FIG. 28A
FIG. 28B
FIG. 27A
FIG. 27B
FIG. 27C

POWER STORAGE APPARATUS

RELATED APPLICATIONS

The present application is a continuation application of U.S. patent application Ser. No. 13/501,122, filed Apr. 10, 2012, which is a National Phase of International Application Number PCT/JP2010/068227, filed Oct. 8, 2010, and claims priority from, Japanese Application Number 2009-237051, filed Oct. 14, 2009 the disclosure of which are hereby incorporated by reference herein in their entirety.

FIELD OF THE INVENTION

This invention relates to a power storage apparatus used in a receiving facility of a wireless power transfer system.

BACKGROUND OF THE INVENTION

Following patent documents published by the Japan Patent Office propose methods of transmitting power to a battery of an electric automobile wirelessly using electromagnetic induction, microwaves, electric field resonance, or magnetic field resonance instead of a transmission cable.

JP2009-106136A, published on May 14, 2009;
JP2002-152996A, published on May 25, 2002;
JP2008-054424A, published on Mar. 5, 2008;
JP2006-174676A, published on Jun. 29, 2006; and
Japan Patent Serial No. 3985390, published on Oct. 3, 2007.

"Wireless Power Transfer via Strongly Coupled Magnetic Resonances", Science vol. 317, pages 83-86, published on Jun. 6, 2007 teaches power transmission techniques using electric field resonance or magnetic field resonance, with which several kilowatts of power can be transferred over a comparatively large gap of several meters, for example.

SUMMARY OF THE INVENTION

It is an object of this invention to achieve reductions in the required space and cost of a receiving facility and an improvement in power transfer efficiency in this type of wireless power transfer system.

In order to achieve the above object, this invention provides a power storage apparatus that stores power transferred from a feeding facility via a wireless power transfer system. The apparatus comprises a plurality of storage cells connected in series or in parallel. Each storage cell comprises a storage element that stores a charge, a container that houses the storage element, a reception antenna that receives power transmitted by the wireless power transfer system, and a charging control circuit that charges the storage element using the power received by the reception antenna.

The details as well as other features and advantages of this invention are set forth in the remainder of the specification and are shown in the accompanying drawings.

BRIEF DESCRIPTION OF THE DRAWINGS

FIGS. 16A-16C are similar to FIGS. 14A-14C, but show a third embodiment of this invention.

FIGS. 18A-18C are a front view, a vertical sectional view, and a plan view of a storage cell according to a fourth embodiment of this invention.

FIGS. 20A-20C are a front view, a vertical sectional view, and a plan view of a storage cell according to a fifth embodiment of this invention.

FIGS. 21A-21C are a front view, a vertical sectional view, and a plan view of a storage cell according to a sixth embodiment of this invention.

FIG. 22 is a plan view of an electrical insulating film, illustrating an arrangement of a secondary self-resonant coil of the storage cell according to the sixth embodiment of this invention.

FIGS. 23A and 23B are a front view and a vertical sectional view of a storage cell according to a seventh embodiment of this invention.

FIG. 24 is a plan view of a laminate film, illustrating an arrangement of a secondary self-resonant coil and a secondary coil of the storage cell according to the seventh embodiment of this invention.

FIGS. 27A-27C are vertical sectional views of the storage cell according to the eighth embodiment of this invention, illustrating a process for manufacturing the storage cell.

FIGS. 28A and 28B are a front view and a plan view of a container for the storage cell according to the eighth embodiment of this invention.

DESCRIPTION OF THE PREFERRED EMBODIMENTS

Figure 1:
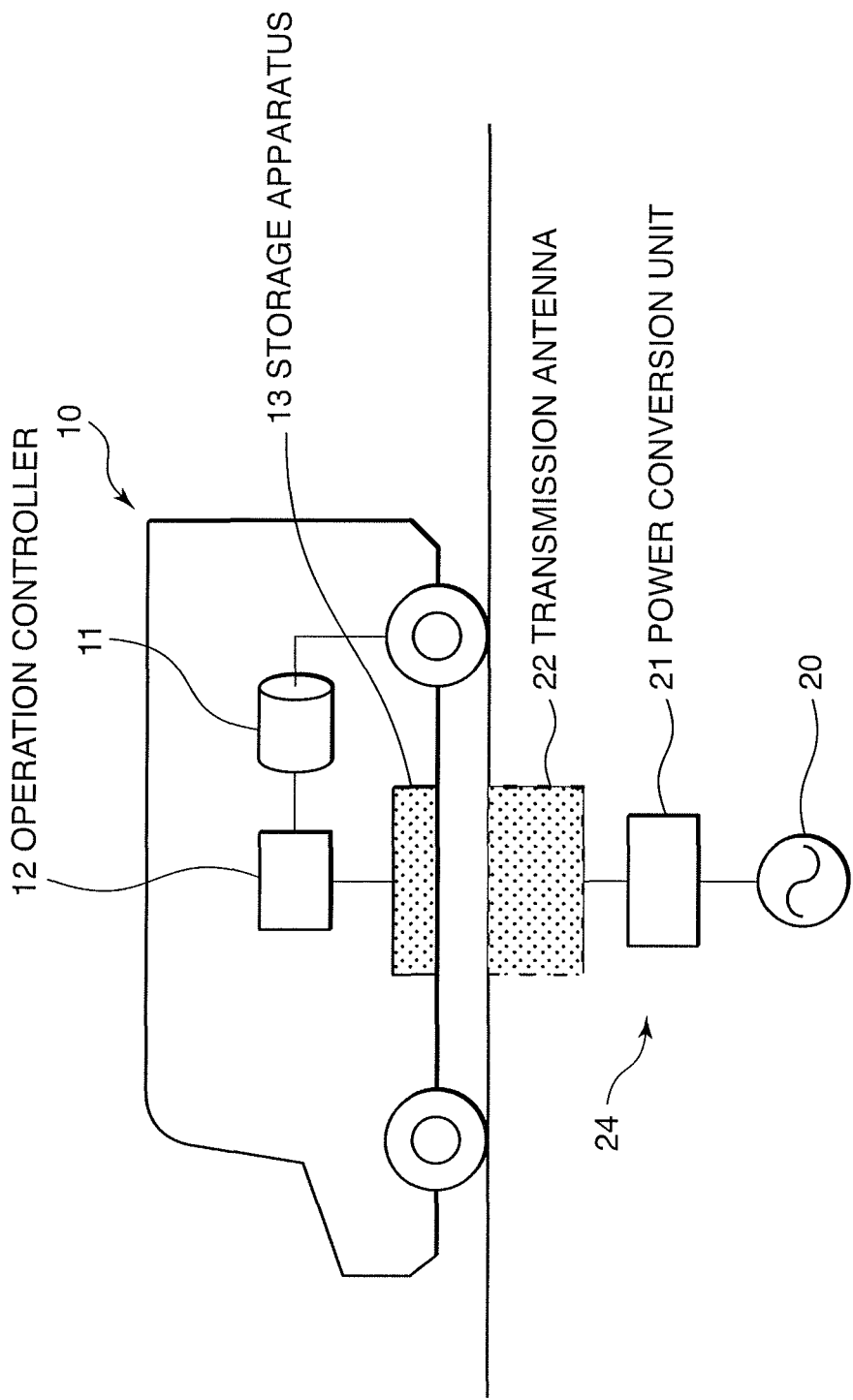
FIG. 1 is a schematic diagram of a wireless power transfer system for a vehicle, to which a power storage apparatus according to this invention is applied.

Referring to FIG. 1 of the drawings, an electric automobile 10 comprises a motor/generator 11 joined to a vehicle wheel, an operation controller 12 that controls an operation of the motor/generator 11, and a storage apparatus 13 that serves as a power supply for the motor/generator 11.

The operation controller 12 causes the electric automobile 10 to travel by converting direct current power supplied from the storage apparatus 13 into alternating current power and supplying the converted power to the motor/generator 11 such that the motor/generator 11 operates as an electric motor. Further, when braking is implemented in the electric automobile 10, the operation controller 12 performs regenerative power generation by driving the motor/generator 11 as a generator using a rotary torque of the vehicle wheel, and stores the generated power in the storage apparatus 13.

An alternating current or a direct current motor/generator is used as the motor/generator 11. The storage apparatus 13 is constituted by an array of a plurality of storage cells, and serves as a direct current high voltage source that supplies direct current power required by the motor/generator 11 to drive the electric automobile 10.

Power is supplied to the storage apparatus 13 from a feeding facility 24 using a wireless power transfer system, i.e. without using a transmission cable. More specifically, when the electric automobile 10 is stationary in a predetermined feeding position, power is supplied to the storage apparatus 13 from the feeding facility 24, which is buried under a road surface, using a wireless power transfer system, i.e. without using a transmission cable.

Furthermore, power is supplied directly to each of the storage cells constituting the storage apparatus 13.

Figure 2:
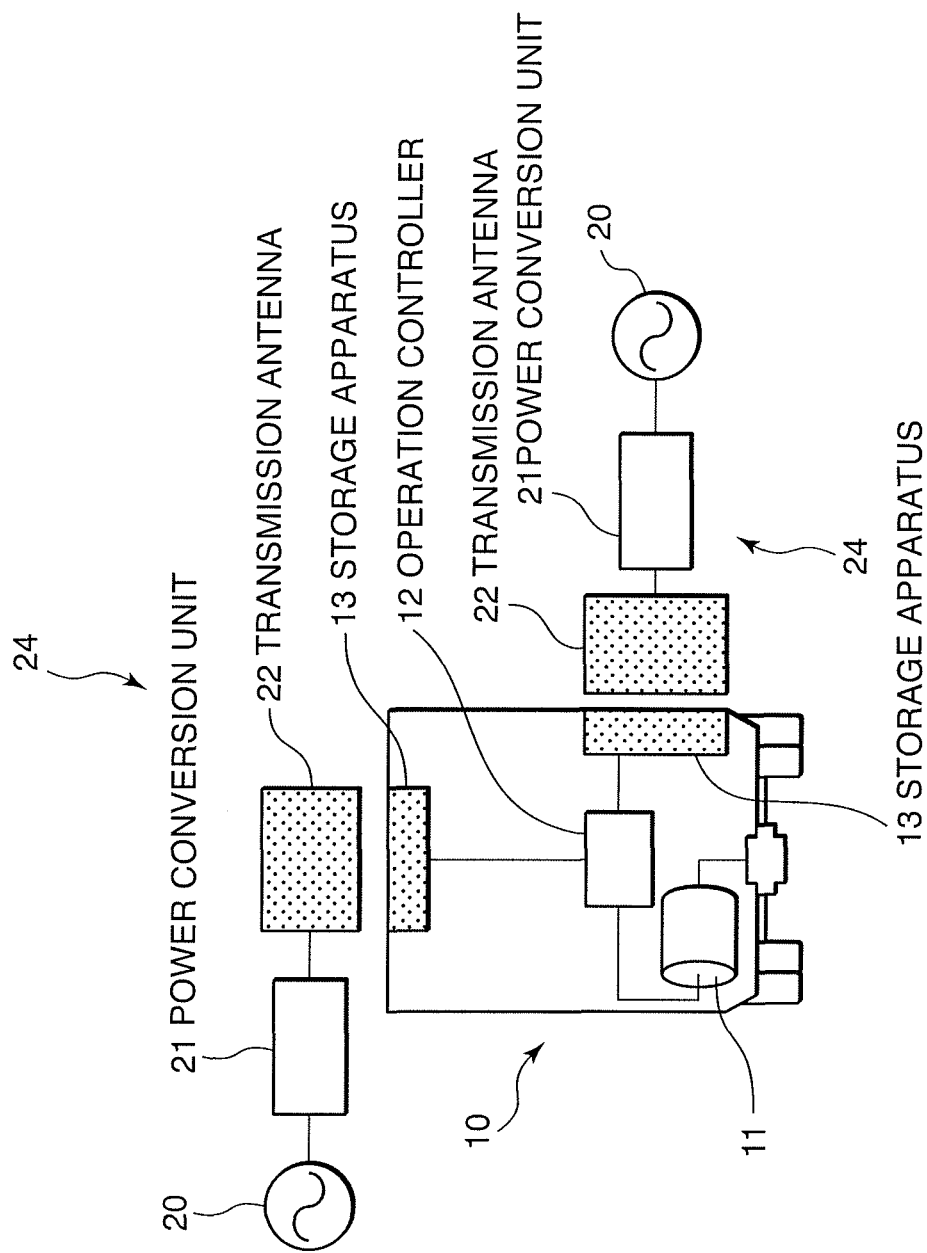
FIG. 2 is a schematic diagram of the wireless power transfer system for a vehicle, illustrating a variation in an arrangement of the wireless power transfer system.

Referring to FIG. 2, instead of burying the feeding facility 24 under the road surface, the feeding facility 24 may be disposed above the electric automobile 10, and the storage apparatus 13 may be disposed in a corresponding ceiling position inside the electric automobile 10. When the electric automobile 10 is stationary in the feeding position, the storage apparatus 13 of the electric automobile 10 opposes a transmission antenna 22.

Figure 3:
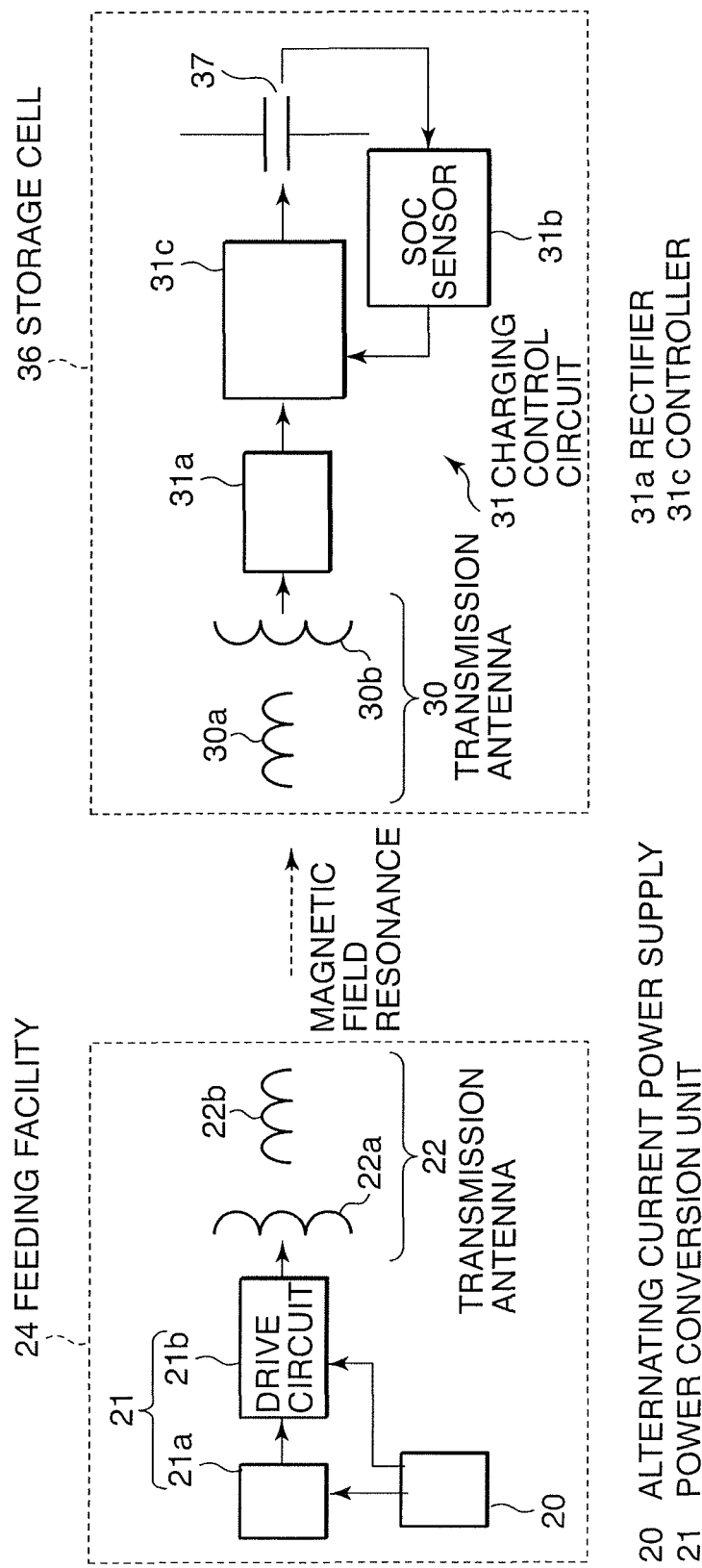
FIG. 3 is a block diagram showing a configuration of the wireless power transfer system for a vehicle shown in FIG. 1.

Referring to FIG. 3, the feeding facility 24 includes an alternating current power supply 20, a power conversion unit 21 that converts power from the alternating current power supply 20 into transmittable power, and the transmission antenna 22, which transmits the power supplied from the power conversion unit 21. In this embodiment, a transmission system employing magnetic field resonance is used as the wireless power transfer system for transferring power between the feeding facility 24 and the storage apparatus 13. Other wireless power transfer systems disclosed in the prior art, i.e. wireless power transfer systems employing electromagnetic induction, microwaves, electric field resonance, and so on, may also be applied.

The alternating current power supply 20 is constituted by a system power supply, for example. The voltage conversion unit 21 is constituted by an oscillating circuit 21a that generates a predetermined high frequency, and a drive circuit 21b that converts output power from the alternating current power supply 20 into power at the high frequency of the oscillating circuit 21a and outputs the converted power to the transmission antenna 22.

The transmission antenna 22 includes a primary coil 22a and a primary self-resonant coil 22b that can be coupled to the primary coil 22a by electromagnetic induction. The primary coil 22a transfers power received from the drive circuit 21b to the primary self-resonant coil 22b by electromagnetic induction. The primary self-resonant coil 22b is an LC resonant coil in which both ends are open.

Figure 8:
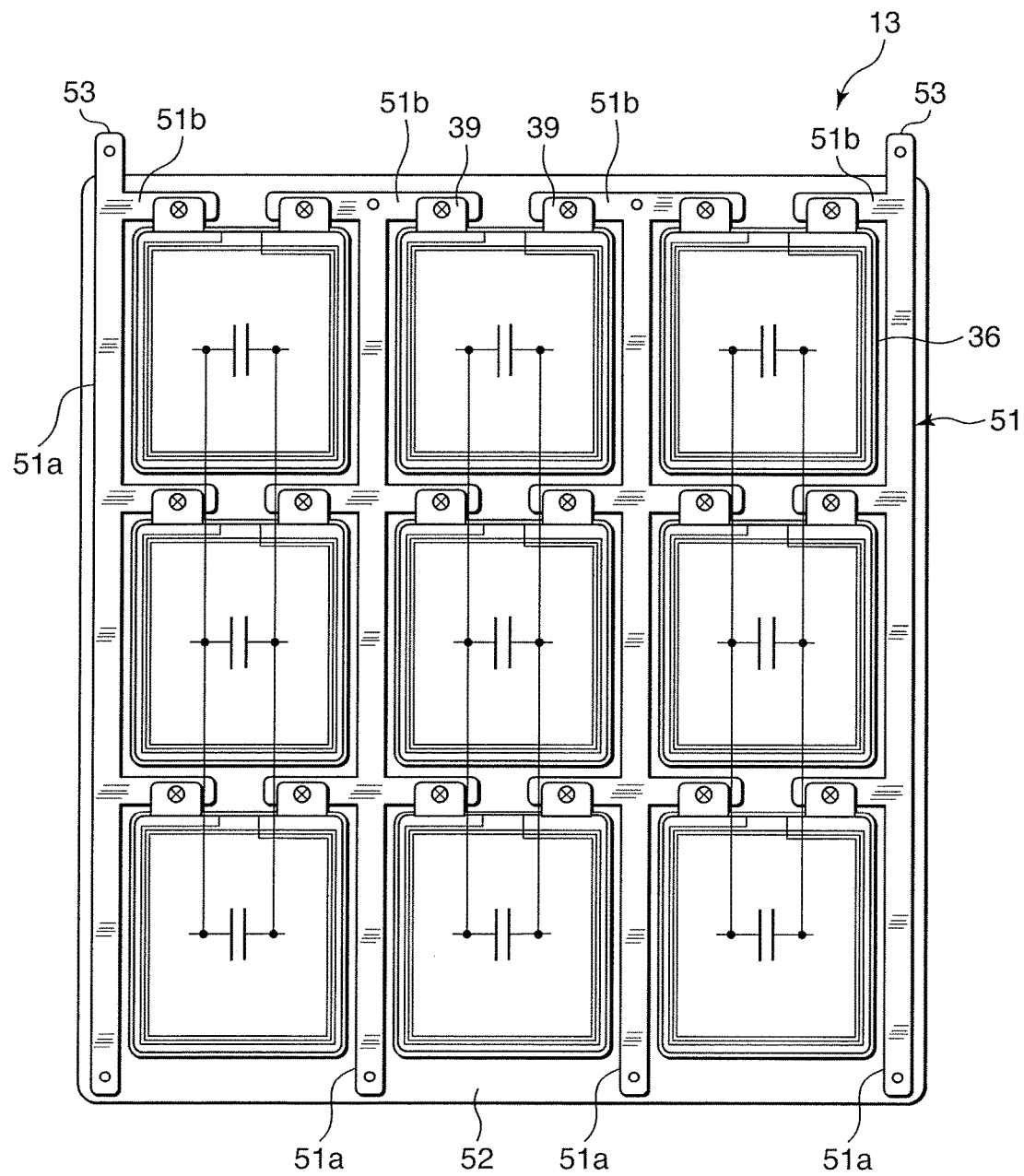
FIG. 8 is a plan view of a storage module according to this invention.

Referring to FIG. 8, the storage apparatus 13 is constituted by a storage module formed by integrating a plurality of storage cells 36 in a frame 52.

Referring back to FIG. 3, each storage cell 36 includes a storage element 37 that performs storage, a reception antenna 30, and a charging control circuit 31. The storage element 37 is constituted by an electric double layer capacitor. The storage element 37 may be formed from a secondary battery such as a nickel battery or a lithium ion battery, or another storage battery. The charging control circuit 31 includes a rectifier 31a, an SOC sensor 31b that detects a state of charge (SOC) of the storage element 37, and a controller 31c.

The reception antenna 30 includes a secondary self-resonant coil 30a and a secondary coil 30b. The secondary self-resonant coil 30a is an LC resonant coil in which both ends are open. The secondary self-resonant coil 30a can be coupled to the primary self-resonant coil 22b by magnetic field resonance. The secondary coil 30b can be coupled to the secondary self-resonant coil 30a by electromagnetic induction in order to supply the rectifier 31a with high frequency power received from the secondary self-resonant coil 30a.

The rectifier 31a rectifies the high frequency power to a direct current, and supplies charging power to the storage element 37 via the controller 31c. The controller 31c controls the charging power supply from the rectifier 31a to the storage element 37 on the basis of a charging amount signal from the SOC sensor 31b that detects the state of the charge of the storage element 37 to ensure that the storage element 37 is not overcharged.

The controller 31c is constituted by a microcomputer and a power control element including a central processing unit (CPU), a read-only memory (ROM), a random access memory (RAM), and an input/output interface (I/O interface). The controller 31c may be constituted by a plurality of analog elements.

By connecting the plurality of storage cells 36 constituted as described above either in series or in series and in parallel, the storage apparatus 13 is formed as a high voltage direct current power supply having a capacity required to drive the electric automobile 10. In the storage apparatus 13, therefore, each storage cell 36 includes the reception antenna 30 and the charging control circuit 31 so that the respective storage cells 36 can also be charged independently of each other with the power supplied from the feeding facility 24.

At this time, charging may be performed in a coordinated fashion by causing the respective storage cells 36 to share voltage information with each other using a Radio Frequency IDentificationn (RFID) technique employing radio waves.

More specifically, as shown in FIG. 1, the electric automobile 10 is stopped in the feeding position where the storage apparatus 13 opposes the feeding facility 24, whereupon the feeding facility 24 is operated. As a result, the primary self-resonant coil 22b of the transmission antenna 22 and the secondary self-resonant coil 30a of the reception antenna 30 of each storage cell 36 are coupled by magnetic field resonance such that power is transmitted from the transmission antenna 22 in parallel to the reception antenna 30 of each storage cell 36. In each storage cell 36, the high frequency power received by the reception antenna 30 is converted into a direct current by the rectifier 31a, whereupon the direct current is stored in the storage element 37 via the charging control circuit 31.

By providing the reception antenna 30 and the charging control circuit 31 in each storage cell 36 in this manner, the storage apparatus 13 can easily be constructed with a desired capacity simply by modifying the number of storage cells 36. Moreover, since a large reception antenna and a large charging control circuit are not required, a space required to install the storage apparatus 13 in the electric automobile 10 can be reduced.

The storage apparatus 13 charges the storage elements 37, which have a charging voltage of 3-5V, independently and in parallel, and therefore power transfer loss is small. As a result, a high degree of power transfer efficiency can be obtained. A post-reception charging path is short, and therefore power loss based on wiring resistance is also suppressed.

Figure 4:
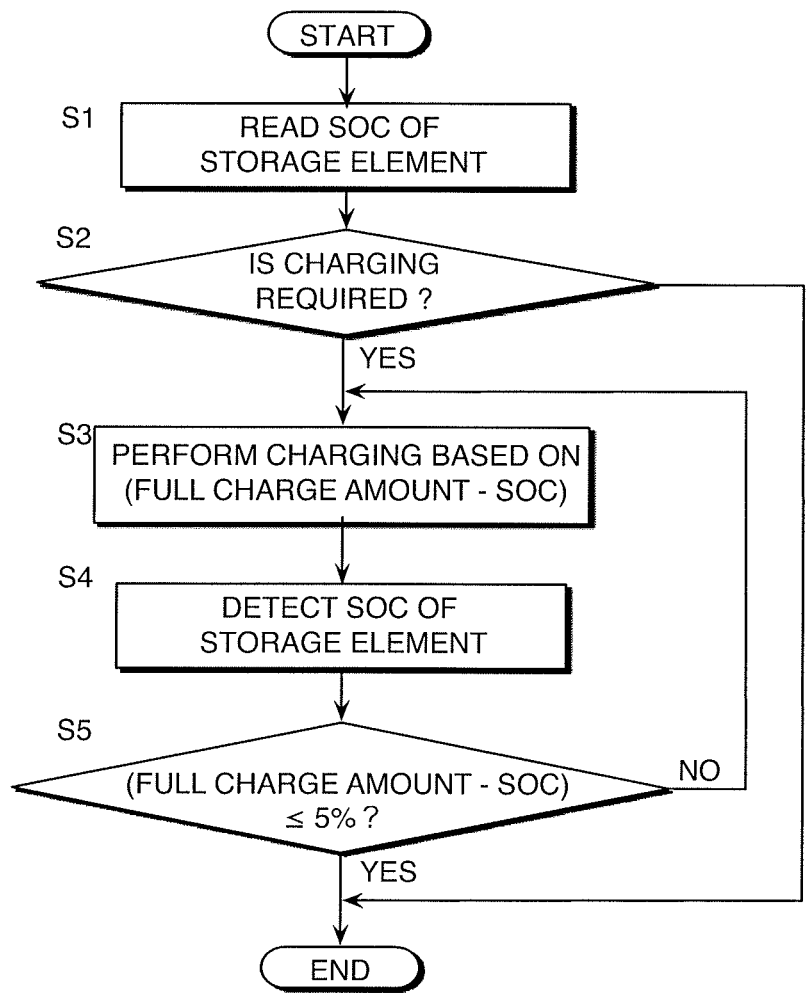
FIG. 4 is a flowchart illustrating a charging control routine executed by a controller built into each storage cell.
Figure 5:
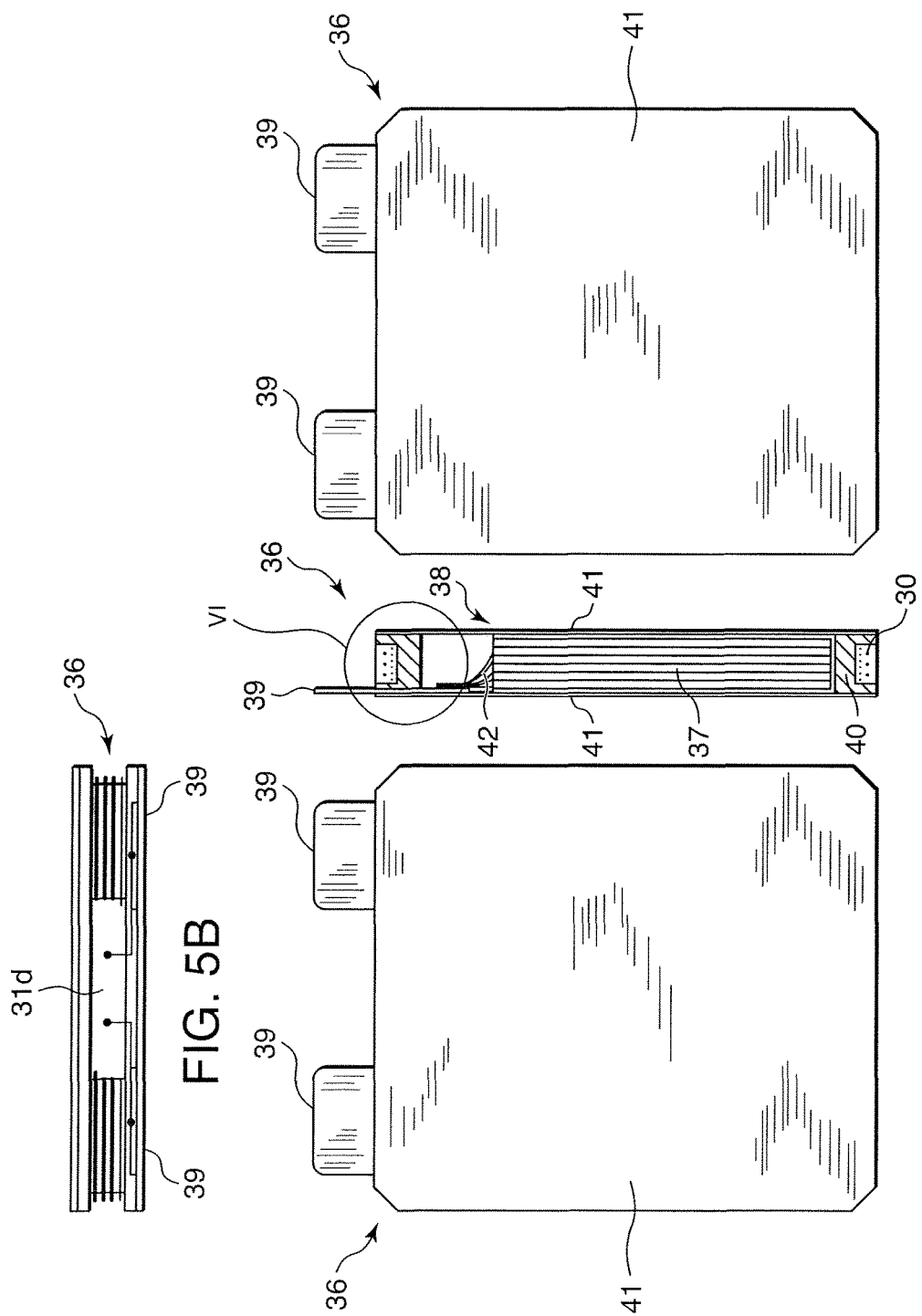
FIGS. 5A-5D are a front view, a plan view, a rear view, and a vertical sectional view of the storage cell.

Referring to FIG. 4, a charging control routine executed by the controller 31c with regard to the storage element 37 will now be described. This routine is executed only once by each controller 31c when the electric automobile 10 is stopped in the predetermined feeding position, using a charging command signal output to the charging control circuit 31 of each storage cell 36 by the operation controller 12 as a trigger.

The controller 31c is provided in each storage cell 36, and therefore the controller 31c of each storage cell 36 executes this routine in relation to charging of the storage element 37 in the storage cell 36.

In a step S1, the controller 31c reads the state of charge (SOC) of the storage element 37, detected by the SOC sensor 31b.

In a step S2, the controller 31c determines whether or not the storage element 37 requires charging. More specifically, the controller 31c determines whether or not the SOC of the storage element 37 is equal to or lower than a charging determination threshold. When the storage element 37 is constituted by an electric double layer capacitor, the charging determination threshold is set at 30-40% of a full charge amount, for example. When the storage element 37 is constituted by a secondary battery, on the other hand, the charging determination threshold is set at 60-70% of the full charge amount, for example.

When the determination of the step S2 is affirmative, the controller 31c charges the storage element 37 using the direct current output by the rectifier 31a in a step S3 onward. When the determination of the step S2 is negative, the controller 31c terminates the routine without charging the storage element 37.

In the step S3, the controller 31c performs charging on the storage element 37 over a predetermined time period on the basis of a difference between the full charge amount and the SOC of the storage element 37.

In a step S4, the controller 31c detects the SOC of the storage element 37 again from an output signal of the SOC sensor 31b.

In a step S5, the controller 31c determines whether or not the difference between the full charge amount and the SOC of the storage element 37 has fallen to within 5%. When the determination of the step S5 is affirmative, the controller 31c determines that charging of the storage element 37 is complete, and terminates the routine. When the determination of the step S5 is negative, the controller 31c repeats the charging processing of the steps S3-S5 until the determination of the step S5 becomes affirmative.

It should be noted that charging of the storage element 37 in the step S3 is performed only when the SOC of the storage element 37 is equal to or lower than the charging determination threshold in the step S2 or when the difference between the full charge amount and the SOC of the storage element 37 is greater than 5% in the step S5. In other words, according to the algorithm described above, charging is not performed when the SOC of the storage element 37 is in the vicinity of the full charge amount.

After receiving a storage command signal from the operation controller 12, each controller 31c charges the storage element 37 in accordance with the SOC of the storage element 37 detected by the SOC sensor 31b in the manner described above. Charging of the respective storage elements 37 is controlled individually on the basis of the SOC of each storage element 37, and therefore the storage apparatus 13 can exhibit a high degree of storage efficiency. Further, by varying the number of storage cells 36, the storage apparatus 13 can easily be made to comply with a required storage capacity. As a result, the storage apparatus according to this invention can be reduced in cost.

An electric double layer capacitor is capable, in principle, of rapid charging in units of several seconds. Therefore, by combining the storage element 37 to which an electric double layer capacitor is applied with a wireless power transfer system using magnetic field resonance, the respective storage cells 36 can be charged rapidly while passing over the feeding facility 24, for example.

To realize a favorable degree of charging efficiency in a case where the storage apparatus is formed by employing an electric double layer capacitor as the storage element and combining a plurality of the storage elements in series or in parallel, each cell must be charged to capacity while operating the respective storage elements in a coordinated fashion. This processing is required to prevent overcharging and over-discharging of the individual storage elements. Therefore, equalization processing is performed with respect to voltages of the respective storage elements 37 prior to charging/discharging. This operation is known as initializing. In the storage apparatus 13, however, the SOC is determined in relation to each individual storage cell 36, and charging is performed individually and concurrently in accordance with the SOC, and therefore similar functions can be realized even when an equalization circuit used for initializing is omitted.

Next, referring to FIGS. 5A-5D and FIG. 6, a structure of the storage cell 36 will be described.

Referring to FIGS. 5A-5D, the storage cell 36 includes the storage element 37 that stores a charge, a container 38 that houses the storage element 37, and a pair of electrode terminals 39 connected to the storage element 37.

The storage element 37 is constituted by a laminated body formed by laminating a predetermined number of rectangular positive electrode bodies and negative electrode bodies and separators interposed therebetween. The positive electrode body and the negative electrode body are constituted by an electrode layer that stores a charge, a collector layer that outputs and inputs the charge, and a lead 42 connected to the collector layer. The leads 42 of homopolar collector layers are bundled together and connected to the electrode terminal 39 of a corresponding polarity.

The container 38 includes a rectangular frame 40 surrounding the storage element 37, and a pair of film bodies 41 adhered to either surface of the rectangular frame 40. The reception antenna 30 and a rectifying/charging control circuit board 31d are fixed to the rectangular frame 40. The rectifying/charging control circuit board 31d is formed by disposing the charging control circuit 31 including the rectifier 31a on a substrate having an electric insulation property, and an output terminal of the rectifier 31a is connected in advance to an input terminal of the controller 31c.

The rectangular frame 40 is formed from resin having a thermal bonding property and an electric insulation property. The rectangular frame 40 has a rectangular inner peripheral surface in order to surround an outer periphery of the storage element 37, which has a rectangular cross-section. The film body 41 is formed by cutting a laminate film obtained by laminating a plurality of resin layers having an electric insulation property onto an intermediate layer made of metallic foil into a substantially identical shape to an outer shape of the rectangular frame 40. A resin layer having a thermal bonding property and an electric insulation property is disposed on a surface of the film body 41 that opposes an inner side of the rectangular frame 40.

Figure 6:
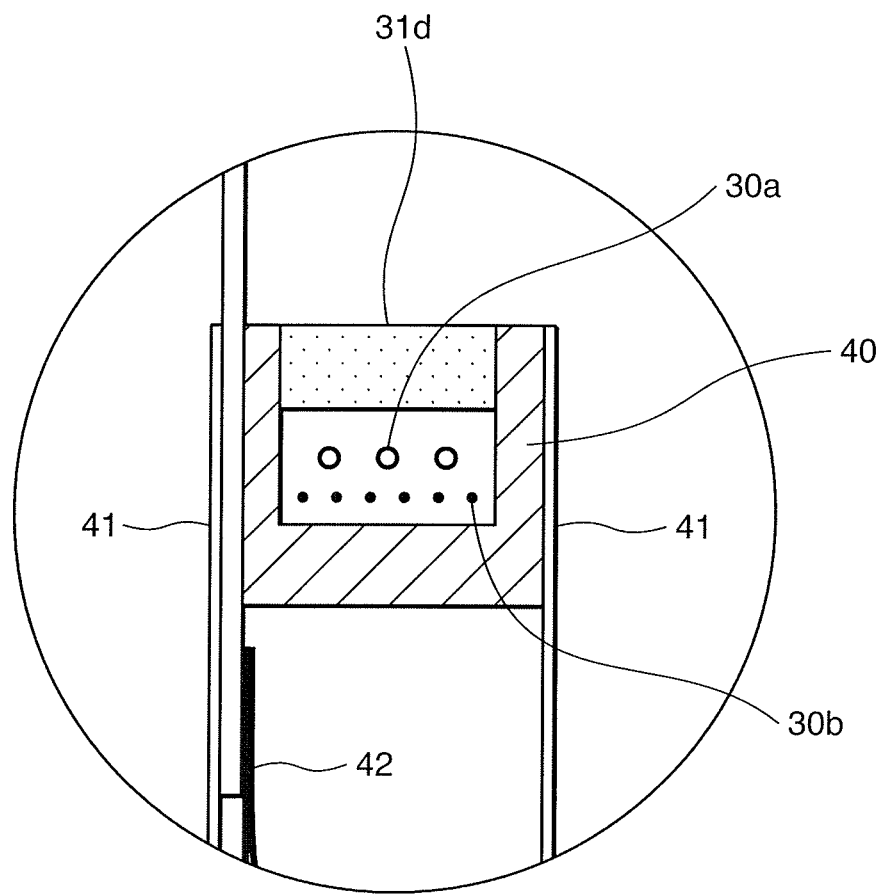
FIG. 6 is an enlarged vertical sectional view of essential parts of the storage cell shown in a part VI of FIG. 5D.

Referring to FIG. 6, the rectangular frame 40 takes a bobbin shape with a groove formed in an outer periphery thereof. The secondary self-resonant coil 30a and the secondary coil 30b of the reception antenna 30 are wound around an inner side of the groove. The secondary coil 30b is wound so as to approach a bottom part of the groove. The secondary self-resonant coil 30a is wound on an outer side of the secondary coil 30b. It should be noted, however, that the figure shows one embodiment, and the secondary coil 30b may be wound on the outer side of the secondary self-resonant coil 30a. An arrangement of the coils 30a and 30b should be set to maximize reception efficiency.

The rectifying/charging control circuit board 31d is disposed on the inner side of the groove and an outer side of the secondary self-resonant coil 30a.

Respective ends of the secondary coil 30b are connected to an input terminal of the rectifier 31a on the rectifying/charging control circuit board 31d. The secondary self-resonant coil 30a is an LC resonant coil in which both ends are open. An output terminal of the controller 31c on the rectifying/charging control circuit board 31d is connected to the pair of electrode terminals 39 via a wire.

Referring to FIGS. 7A-7G, a manufacturing process of the storage cell 36 will now be described.

Figure 7:
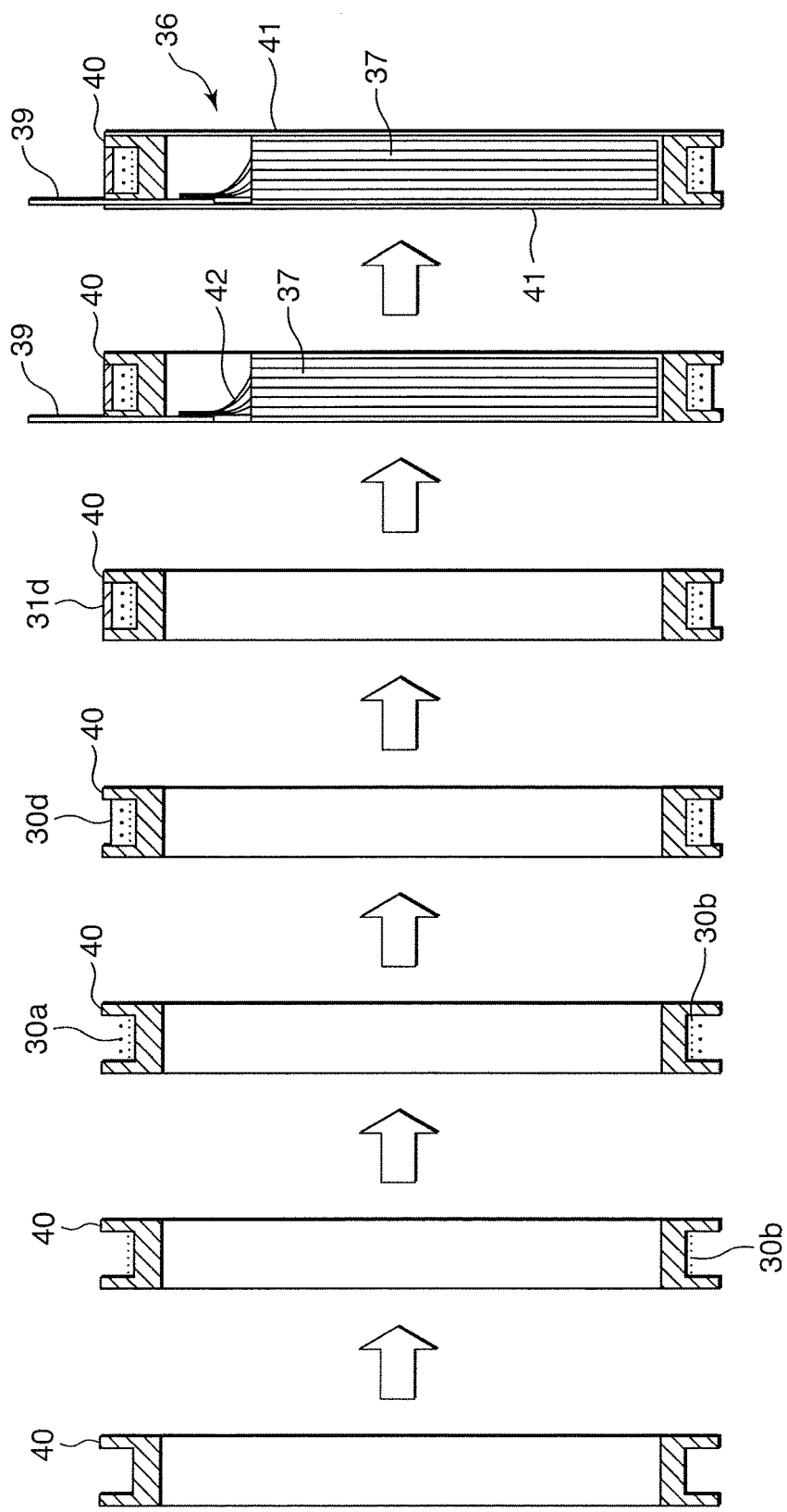
FIGS. 7A-7G are vertical sectional views of the storage cell, illustrating a process for manufacturing the storage cell.

As shown in FIG. 7A, the rectangular frame 40 is molded integrally in advance into a bobbin shape having a groove in the outer periphery thereof. At this stage, the film bodies 41 are not adhered. As shown in FIG. 7B, first, the secondary coil 30b is wound around the groove in the outer periphery of the rectangular frame 40. The secondary self-resonant coil 30a is then wound around the secondary coil 30b, as shown in FIG. 7C, whereupon the coils 30a, 30b are fixed by a molding material 30d, as shown in FIG. 7D. A material exhibiting superior electrical insulation and water resistance properties is used as the molding material 30d.

As shown in FIG. 7E, the rectifying/charging control circuit board 31d is attached to an outer side of the molding material 30d inside the groove, whereupon the respective ends of the secondary coil 30b are connected to the input terminal of the rectifier 31a on the rectifying/charging control circuit board 31d.

Next, as shown in FIG. 7F, the storage element 37 constituted by an electric double layer capacitor is disposed inside the rectangular frame 40, and the pair of the electrode terminals 39 are fixed to the rectangular frame 40. The electrode terminal 39 is a plate-shaped member, and by fixing an intermediate portion thereof to an end surface of the rectangular frame 40, one end projects to the outside of the rectangular frame 40 while the other end projects to the inside of the rectangular frame 40. As described above, the leads 42 of the homopolar collector layers of the storage element 37 are bundled and connected by welding or the like to a projecting portion of each electrode terminal 39 projecting to the inside of the rectangular frame 40.

In this condition, as shown in FIG. 7G, the film bodies 41 are fixed to a front surface and a back surface of the rectangular frame 40 by heat seal processing. It is to be noted that a left side end surface and a right side end surface of the rectangular frame 40 in the figure will be referred to respectively as the front surface and the back surface.

In the heat seal processing, the film body 41 is placed over the front surface of the rectangular frame 40, including the intermediate portion of the electrode terminal 39 fixed to an upper edge of the front surface of the rectangular frame 40 in a previous step, whereupon pressure and heat are applied to the front surface of the rectangular frame 40 and a peripheral edge portion of the film body 41 using a heat sealer.

As a result of the heat seal processing performed to fix the film body 41 to the front surface of the rectangular frame 40, the thermal bonding resin of the film body 41 and the thermal bonding resin of the rectangular frame 40 are fused. Following heat discharge, the thermal bonding resin coagulates, whereby the film body 41 is adhered to the rectangular frame 40 without gaps. Further, the intermediate portion of the pair of electrode terminals 39 is enveloped in the coagulated resin such that a periphery thereof is sealed without gaps. In other words, the thermal bonding resin can also be adhered to the electrode terminals. Finally, the output terminal of the controller 31c on the rectifying/charging control circuit board 31d is connected to the pair of electrode terminals 39 using a wire.

The film body 41 is fixed to the back surface of the rectangular frame 40 in a similar manner by heat seal processing.

Through the process described above, the storage cell 36 including the reception antenna 30 and the rectifying/charging control circuit board 31d can be manufactured easily and at low cost.

In the storage cell 36, the storage element 37 is not fixed specially to the rectangular frame 40. The reason for this is as follows.

Referring back to FIG. 8, the storage apparatus 13 according to this embodiment is constituted by a storage module formed by integrating a plurality of the storage cells 36 on a plane using the frame 52 in which rectangular holes having a substantially identical size to the storage cells 36 are formed in a row direction and a column direction. A front surface and a back surface of the storage module are sandwiched between plates made of a permeable material and fastened by bolts such that displacement of the storage element 37 in each storage cell 36 in a frame penetrating direction relative to the rectangular frame 40 is restricted. Displacement of the storage element 37 relative to the rectangular frame 40 in other directions is restricted by aligning an inner peripheral dimension of the rectangular frame 40 with an outer peripheral dimension of the storage element 37 in advance. Hence, relative displacement between the storage element 37 and the rectangular frame 40 is prevented without fixing the storage element 37 to the rectangular frame 40, and therefore the storage element 37 is held inside the rectangular frame 40 with stability. Further, displacement of the storage cell 36 in a frame penetrating direction relative to the frame 52 is restricted.

Instead of sandwiching the front surface and the back surface of the storage module between plates made of a permeable material and fastening the front and back surfaces with bolts, a silicon molding agent may be charged into the rectangular frame 40 and hardened when the storage element 37 is disposed in the rectangular frame 40.

A bus bar 51 is fixed to the frame 52.

The bus bar 51 is constituted by four girders 51a and branch beams 51b projecting respectively in a right angle direction from three points of each girder 51a. The branch beams 51b project from adjacent girders 51a in three opposing locations. The adjacent girders 51a and the opposing branch beams 51b form rectangular spaces that correspond to the rectangular holes in the frame 52. The respective storage cells 36 are disposed in the frame 52 so as to be buried in the rectangular holes in the frame 52 via the respective rectangular spaces.

Of the four girders 51a, a right end girder 51a in the figure constitutes a positive electrode of the storage module. Further, a left end girder 51a in the figure constitutes a negative electrode of the storage module. A total of nine storage cells 36 are disposed between the positive electrode and the negative electrode in three columns of three. The three storage cells 36 disposed parallel to the respective girders 51a are connected in parallel. The three storage cells 36 respectively connected in parallel between the positive electrode and the negative electrode of the storage module are connected in series.

The girders 51a positioned on either left-right direction end of the bus bar 51 in the figure, i.e. the girders 51a forming the positive electrode and the negative electrode, include a wire connection portion 53 that projects upward in the figure. The respective connection portions 53 of the girder 51a forming the positive electrode and the girder 51a forming the negative electrode are connected to the motor/generator 11 via the operation controller 12.

A magnetic shielding plate made of a non-permeable material, not shown in the figure, is disposed on one surface of the frame 52, more specifically a side that does not oppose the transmission antenna 22 when the storage apparatus 13 is installed in the electric automobile 10. The magnetic shielding plate serves to prevent received power leakage from the storage cells 36.

In the figure, a total of nine storage cells 36 arranged in three rows and three columns are disposed in the frame 52, but the number of storage cells 36 forming the storage module may be set as desired.

By forming the storage apparatus 13 as this type of storage module, a storage apparatus having a required capacity can be constructed efficiently and easily, and therefore the storage apparatus 13 is particularly suitable for use in an electric automobile.

Referring to FIGS. 9 to 12, an example of installation of the storage apparatus 13 and a manner in which the storage apparatus 13 is charged will be described.

Figure 9:
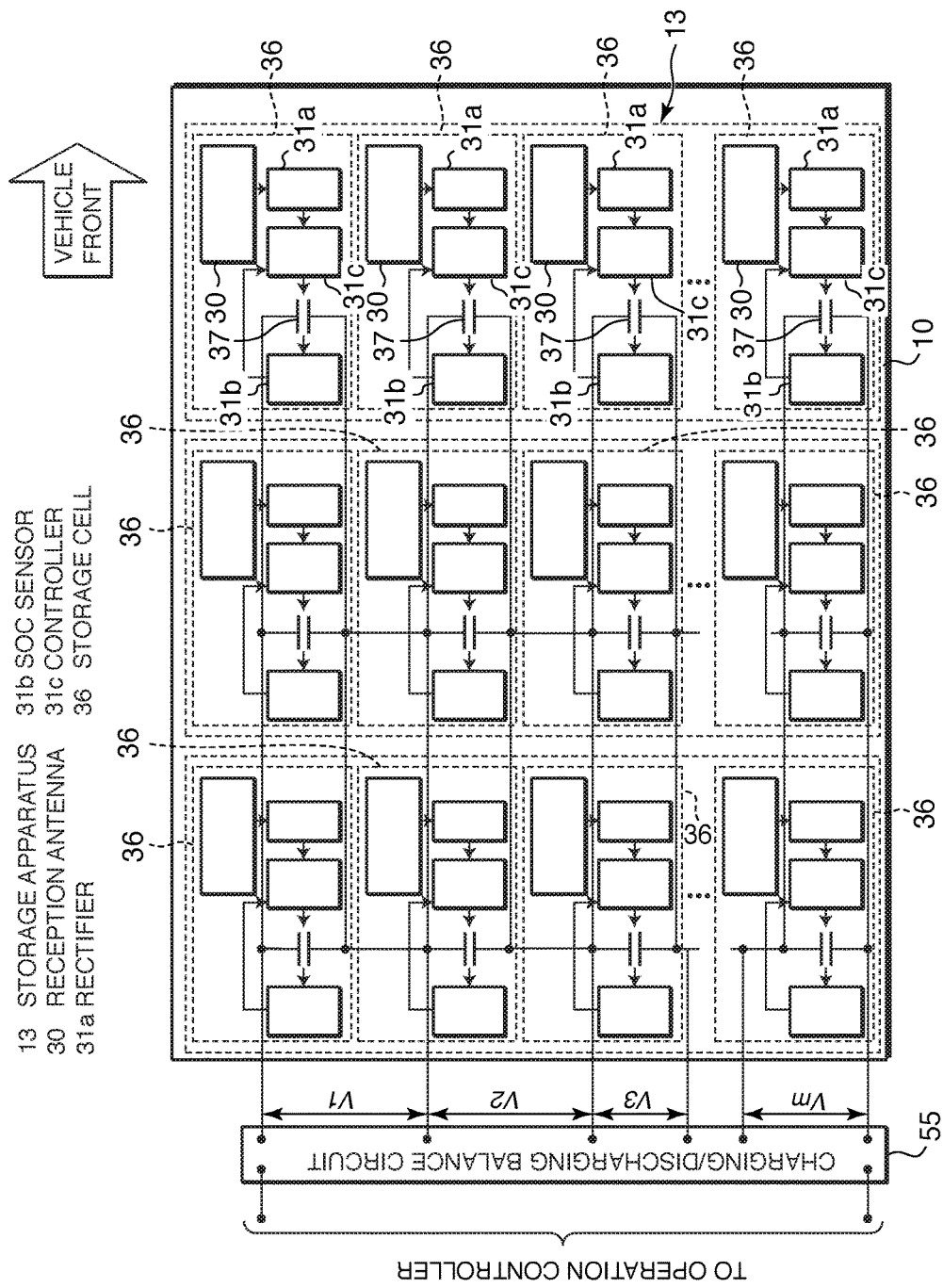
FIG. 9 is a schematic diagram of the storage apparatus installed in a vehicle.

Referring to FIG. 9, the storage apparatus 13 is constituted by a storage module in which m storage cells 36 are arranged in a cross-sectional direction of the electric automobile 10 and a resulting component is disposed in three rows in a front-rear direction of the electric automobile 10. The three storage cells 36 arranged in the front-rear direction of the electric automobile 10 are connected in parallel. M cell groups constituted respectively by the three storage cells 36 connected in parallel are connected in series. In the following description, a row of storage cells 36 disposed in a front portion of the electric automobile 10 will be referred to as a front row, a row of storage cells 36 disposed in an intermediate portion of the electric automobile 10 will be referred to as an intermediate row, and a row of storage cells 36 disposed in a rear portion of the electric automobile 10 will be referred to as a rear row. The m storage cells 36 in each row are electrically connected in series.

In this embodiment, three storage cells 36 are disposed in the front-rear direction of the electric automobile 10, but as noted above, the number of storage cells 36 forming the storage module may be set as desired.

Figure 10:
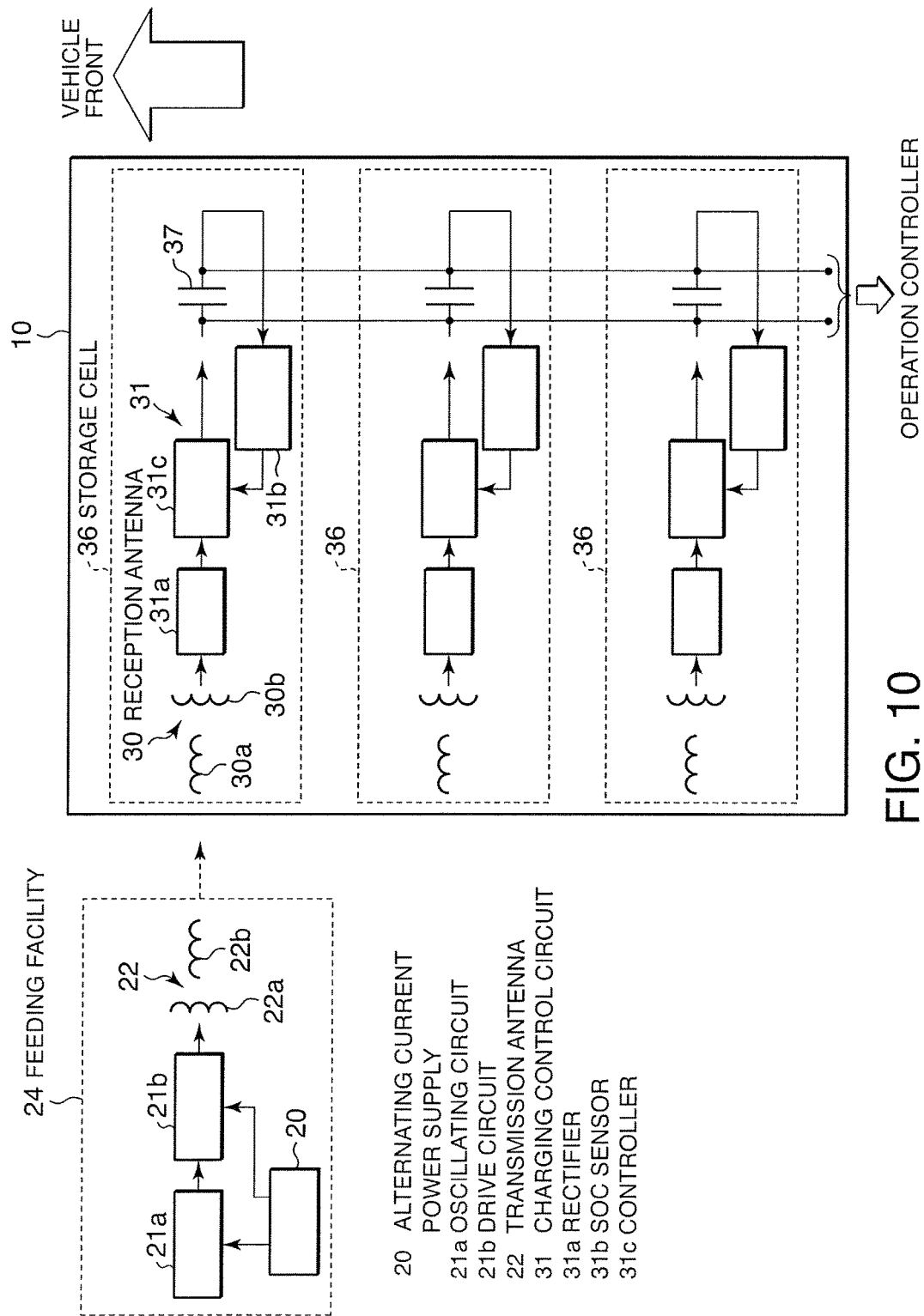
FIG. 10 is a schematic plan view of a vehicle, illustrating a positional relationship between a feeding facility and the storage apparatus.
Figure 11:
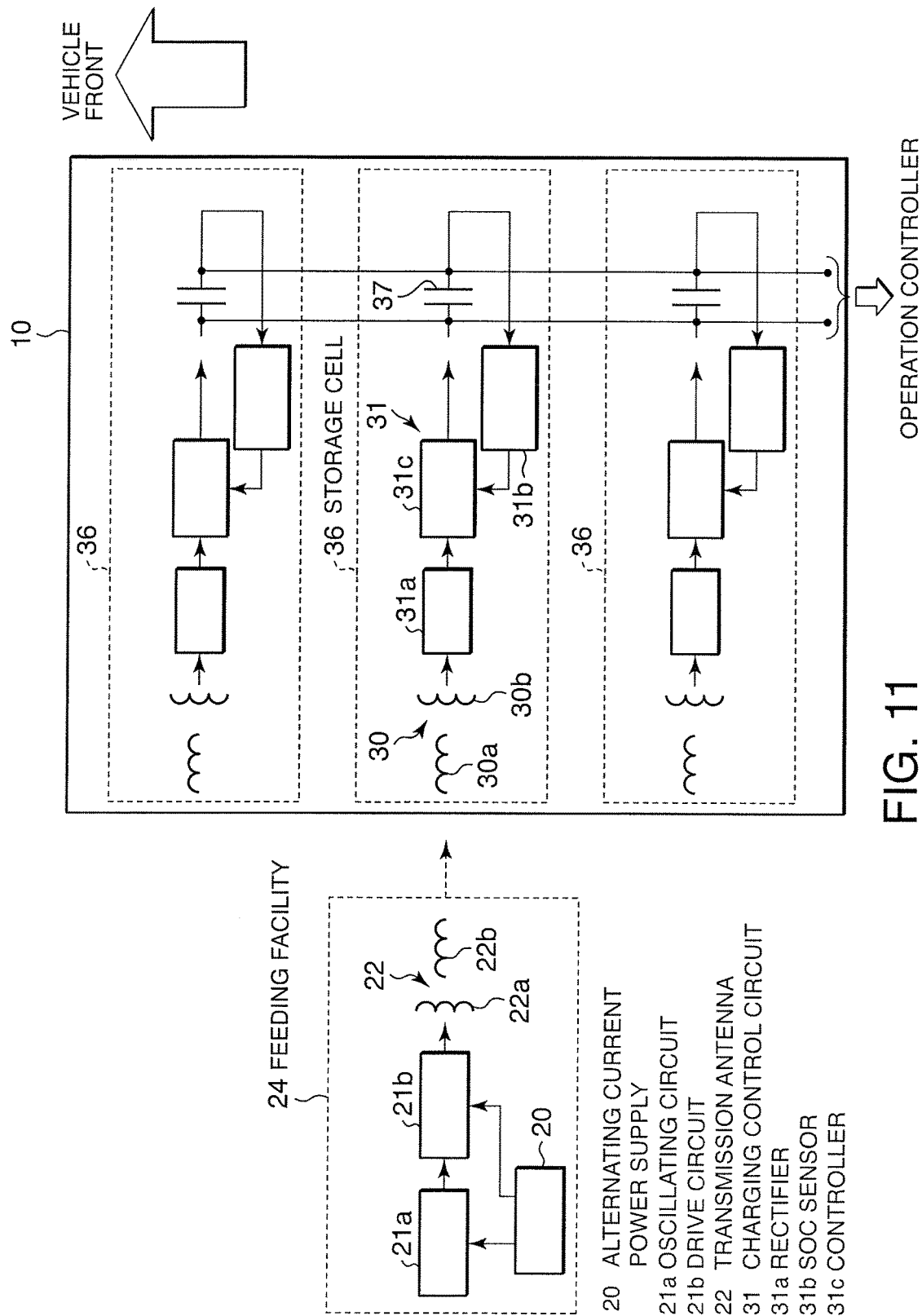
FIG. 11 is similar to FIG. 10, but shows another positional relationship.
Figure 12:
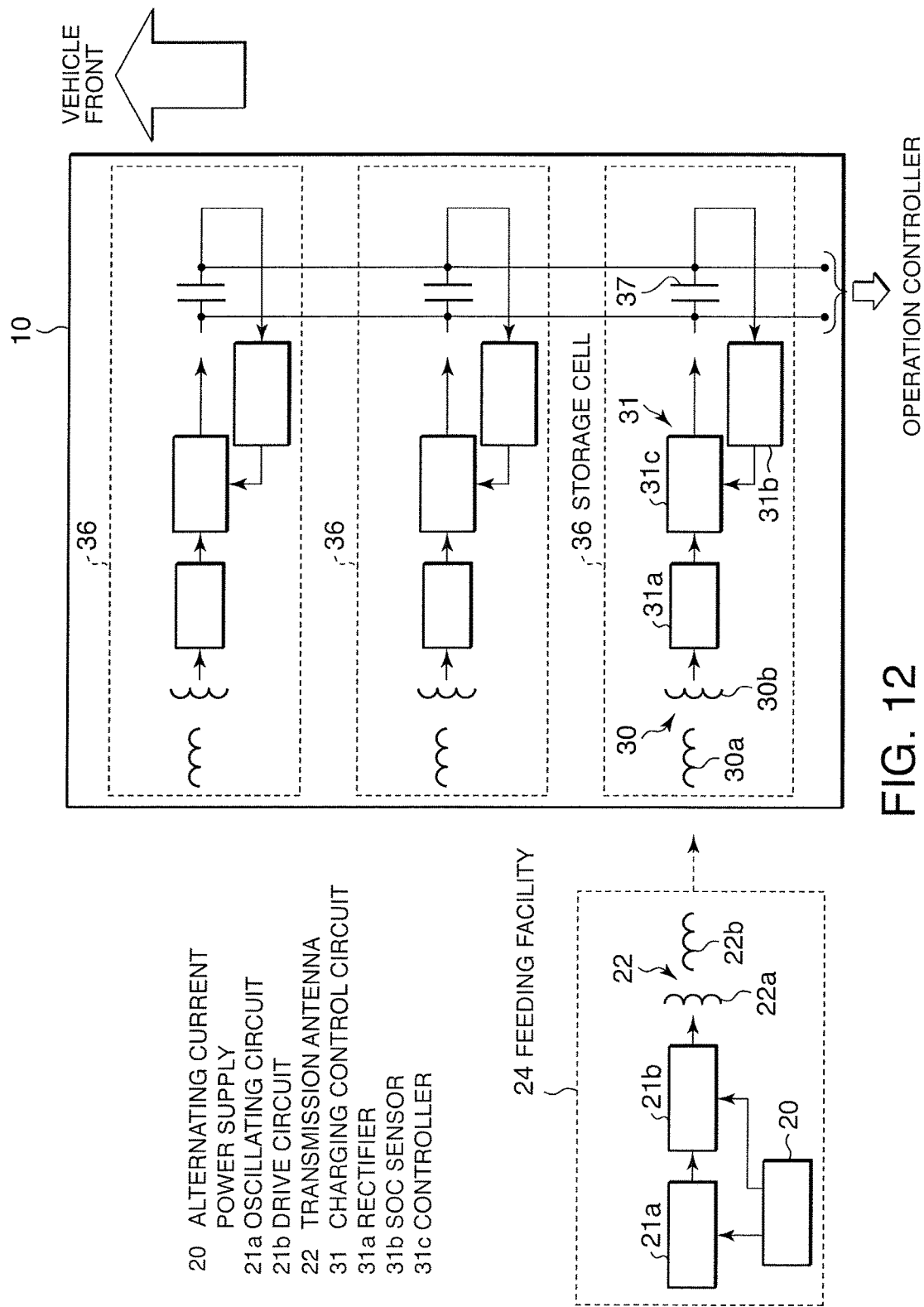
FIG. 12 is similar to FIG. 10, but shows a yet another positional relationship.

When the electric automobile 10 passes over the feeding facility 24, positional relationships between the respective storage cells 36 and the feeding facility 24 vary as shown in FIGS. 10 to 12. For ease of description, FIGS. 10 to 12 each depict only three storage cells 36. However, the installed storage module is identical to the storage module shown in FIG. 9, and therefore the three storage cells 36 shown in FIGS. 10 to 12 represent the storage cells 36 of the front row, the intermediate row, and the rear row, respectively. Likewise for ease of description, the feeding facility 24 is depicted on a left side of the electric automobile 10 in the figures, but in actuality, the feeding facility 24 is buried in a road under the electric automobile 10.

Referring to FIG. 10, when the secondary self-resonant coils 30a of the front row storage cells 36 move above the primary self-resonant coil 22b of the feeding facility 24, magnetic field resonance between the respective coils is activated. As a result, power is transmitted from the primary self-resonant coil 22b of the feeding facility 24 to the secondary self-resonant coils 30a of the front row storage cells 36, whereupon the power received by the secondary self-resonant coil 30a is supplied to the rectifier 31a from the secondary coil 30b and charged to the storage element 37 via the controller 31c. A vehicle position in which this positional relationship is realized will be referred to as a vehicle position A.

Figure 13:
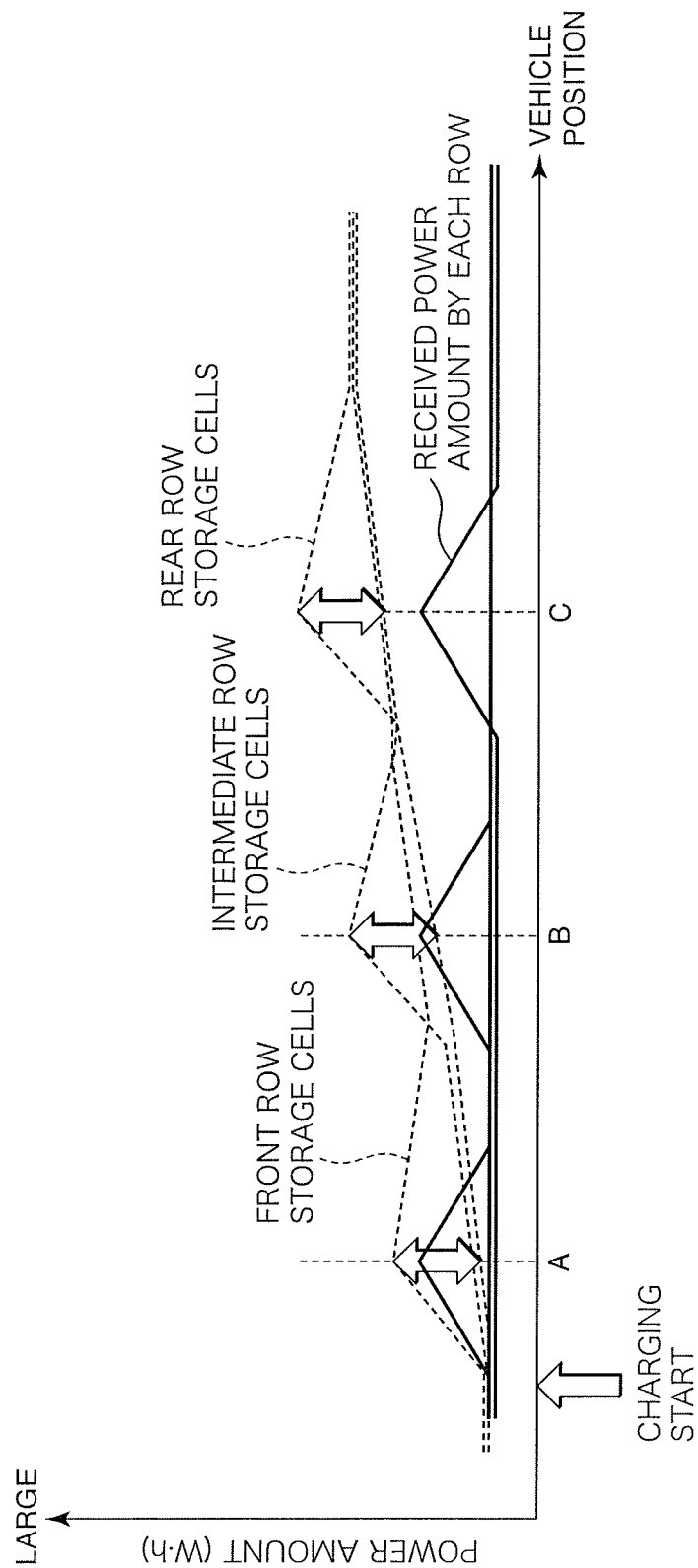
FIG. 13 is a diagram showing a received power amount and a stored power amount of the storage apparatus at respective points.

Referring to FIG. 13, when a potential of the front row storage cells 36 increases at a point A, a potential difference is generated between the front row storage cells 36 and the intermediate row and rear row storage cells 36 connected in parallel to the front row storage cells 36. Here, since a charge flows to a lower potential, the potentials of the intermediate row and rear row storage cells 36 increase at a delay relative to the front row storage cells 36.

Referring to FIG. 11, when the secondary self-resonant coils 30a of the intermediate row storage cells 36 move above the primary self-resonant coil 22b of the feeding facility 24, magnetic field resonance between the respective coils is activated. As a result, power is transmitted from the primary self-resonant coil 22b of the feeding facility 24 to the secondary self-resonant coils 30a of the intermediate row storage cells 36, whereupon the power received by the secondary self-resonant coil 30a is supplied to the rectifier 31a from the secondary coil 30b and charged to the storage element 37 via the charging control circuit 31. A vehicle position in which this positional relationship is realized will be referred to as a vehicle position B.

Referring back to FIG. 13, when the potential of the intermediate row storage cells 36 increases, a potential difference is generated between the intermediate row storage cells 36 and the front row and rear row storage cells 36 connected in parallel to the intermediate row storage cells 36. Here, since a charge flows to a lower potential, the potentials of the front row and rear row storage cells 36 increase following the increase in the potential of the intermediate row storage cells 36. In other words, the received power is leveled between the parallel-connected storage cells 36 of the respective rows.

Referring to FIG. 12, when the secondary self-resonant coils 30*a* of the rear row storage cells 36 move above the primary self-resonant coil 22*b* of the feeding facility 24, magnetic field resonance between the respective coils is activated. As a result, power is transmitted from the primary self-resonant coil 22*b* of the feeding facility 24 to the secondary self-resonant coils 30*a* of the rear row storage cells 36, whereupon the power received by the secondary self-resonant coil 30*a* is supplied to the rectifier 31*a* from the secondary coil 30*b* and charged to the storage element 37 via the charging control circuit 31. A vehicle position in which this positional relationship is realized will be referred to as a vehicle position C.

Referring back to FIG. 13, when the potential of the rear row storage cells 36 increases, a potential difference is generated between the rear row storage cells 36 and the front row and intermediate row storage cells 36 connected in parallel to the rear row storage cells 36. Here, since a charge flows to a lower potential, the potentials of the front row and intermediate row storage cells 36 increase following the increase in the potential of the rear row storage cells 36.

Dotted lines in the figure indicate charged power amounts charged to the storage cells 36 installed in the front row, intermediate row, and rear row. Solid lines in the figure indicate received power amounts received by the storage cells 36 in the respective rows from the feeding facility 24 in the vehicle positions A, B, C. A unit used in the figure is watt hours (W×h).

As shown in the figure, when the vehicle passes over the points A, B, C, the charged power amount charged to the storage cells 36 of the corresponding row increases rapidly. However, due to the aforesaid received power leveling action applied among the rows, the charged power amounts charged to the three parallel-connected storage cells 36 of the front row, intermediate row, and rear row are equal.

As regards the storage cells 36 connected in series on the same row, on the other hand, reception conditions of the respective reception antennae 30 are not always uniform. Moreover, charging power redistribution corresponding to the potential difference is not performed between the storage cells 36 connected in series on the same row. As a result, unevenness occurs in potentials V1, V2, . . . , Vm of the m cell groups shown in FIG. 9. In order to average this unevenness, the storage apparatus 13 further includes a charging/discharging balance circuit 55.

The charging/discharging balance circuit 55 includes parallel-connected balance circuits provided singly for each of the series-connected storage cell groups. The operation controller 12 of the motor/generator 11 controls opening and closing of the respective balance circuits during charging/discharging of the storage apparatus 13 so that voltage differences between the storage cell groups are narrowed. The charging/discharging balance circuit 55 is known from JP2002-281685A, published by the Japan Patent Office in 2002, and JP2006-296179A, published by the Japan Patent Office in 2006.

As another method for narrowing the voltage differences between the storage cell groups, a method of transferring power from a cell group having a high voltage to a cell group having a low voltage may be employed. This power transfer method is known from JP2002-135976A, published by the Japan Patent Office in 2002.

The storage apparatus 13 not only stores the power received by the individual storage cells 36 in the corresponding storage elements 37, but also redistributes the power among storage cells 36 on different rows in accordance with potential differences with the storage cells 36 on different rows in order to eliminate these potential differences. Therefore, the power received by the storage apparatus 13 can be stored efficiently.

Further, in the storage apparatus 13, the reception antenna 30 is provided for each storage cell 36, and therefore received power leakage is suppressed. Furthermore, when a defect occurs in a reception function of one of the storage cells 36, power can be stored in the storage cell 36 having the defective reception function via the reception antenna 30 of another storage cell 36. As a result, a reliability of a reception facility of the storage apparatus 13 can be improved.

Moreover, by providing the charging/discharging balance circuit 55, potential differences between the series-connected storage cells 36 are also eliminated.

Referring to FIGS. 14A-14C and FIG. 15, a second embodiment of this invention, pertaining to the configuration of the storage cell 36, will be described.

The storage cell 36 according to this embodiment includes the container 38 constituted by the rectangular frame 40 surrounding the storage element 37 and the pair of film bodies 41 adhered to either surface of the rectangular frame 40, similarly to the storage cell 36 according to the first embodiment. A groove is not formed in the outer periphery of the rectangular frame 40, and instead, a second rectangular frame 60 covers the outer periphery of the rectangular frame 40. The second rectangular frame 60 is formed in a bobbin shape having a groove in its outer periphery, and the secondary self-resonant coil 30*a* and secondary coil 30*b* of the reception antenna 30 are wound around the inner side of the groove in that order and fixed by a molding material. Further, the rectifying/charging control circuit board 31*d* is fixed to the inner side of the groove.

The secondary coil 30*b* is connected to the input terminal of the rectifier 31*a* on the rectifying/charging control circuit board 31*d*. The output terminal of the controller 31*c* on the rectifying/charging control circuit board 31*d* and the pair of electrode terminals 39 are connected via a wire. The pair of electrode terminals 39 are fixed to the rectangular frame 40 in a shape that is bent in a right angle direction in the vicinity of a boundary between the rectangular frame 40 and the second rectangular frame 60 so as not to interfere with the second rectangular frame 60. All other configurations are identical to the first embodiment.

Figure 14:
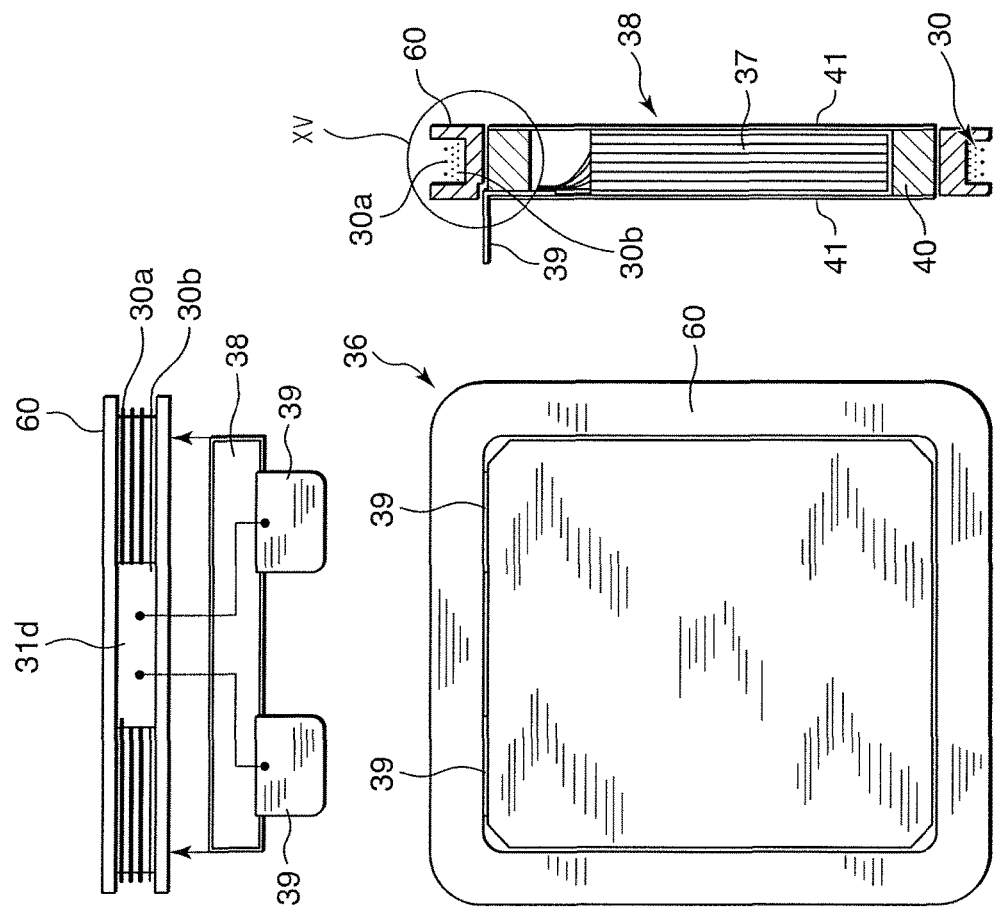
FIGS. 14A-14C are a front view, a vertical sectional view, and a plan view of a storage cell according to a second embodiment of this invention.
Figure 15:
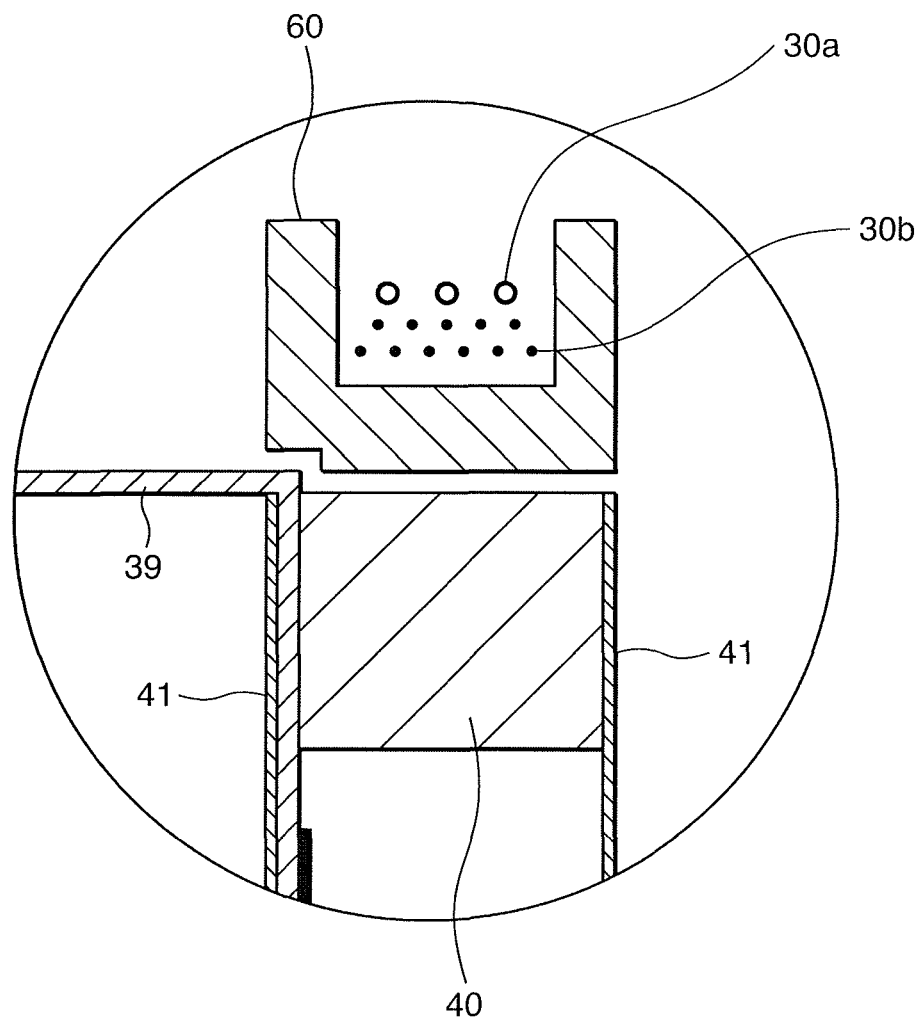
FIG. 15 is an enlarged vertical sectional view of essential parts of the storage cell according to the second embodiment of this invention, shown in a part XV of FIG. 14B.
Figure 17:
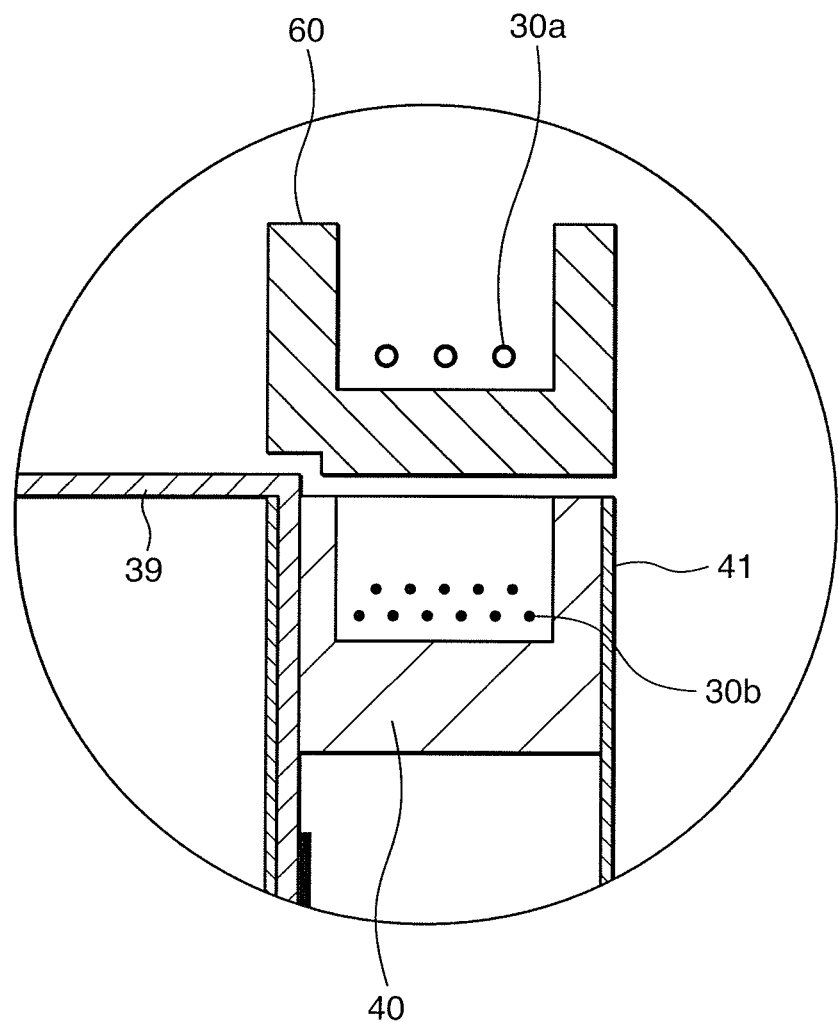
FIG. 17 is an enlarged vertical sectional view of essential parts of a storage cell according to the third embodiment of this invention, shown in a part XVII of FIG. 16B.

According to this embodiment, the reception antenna 30 and the rectifying/charging control circuit board 31*d* are attached to the second rectangular frame 60 in advance, whereby the second rectangular frame 60 can be attached to the outer periphery of the rectangular frame 40 in a condition where the storage element 37 is inserted into the rectangular frame 40 and the front and back surfaces of the rectangular frame 40 are sealed by the film bodies 41, as shown in FIG. 14C. In other words, the storage cell 36 can be formed with a reception function and a charging control function by attaching the rectangular frame 60 to the outer periphery of the container of a pre-existing storage cell not including the reception antenna 30 and the rectifying/charging control circuit board 31*d*.

Referring to FIGS. 16A-16C and FIG. 17, a third embodiment of this invention, pertaining to the configuration of the storage cell 36, will be described.

The storage cell 36 according to this embodiment includes the container 38 constituted by the rectangular frame 40 surrounding the storage element 37 and the pair of film bodies 41 adhered to either surface of the rectangular frame 40, similarly to the storage cell 36 according to the first embodiment. The secondary coil 30b is wound around the groove in the outer periphery of the rectangular frame 40, and the rectifying/charging control circuit board 31d is disposed thereon. The outer periphery of the rectangular frame 40 is covered by the second rectangular frame 60. The second rectangular frame 60 is formed in a bobbin shape having a groove in its outer periphery. The secondary self-resonant coil 30a is wound around the inner side of the groove and fixed by a molding material. The respective ends of the secondary coil 30b are connected to the input terminal of the rectifier 31a on the rectifying/charging control circuit board 31d, and the output terminal of the charging control circuit 31 on the rectifying/charging control circuit board 31d is connected to the pair of electrode terminals 39 via a wire. Similarly to the second embodiment, the pair of electrode terminals 39 are fixed to the rectangular frame 40 in a shape that is bent by substantially 90 degrees so as not to interfere with the second rectangular frame 60.

According to this embodiment, when a defect occurs in the secondary coil 30b and the secondary self-resonant coil 30a, the defective coil can be replaced alone by removing the second rectangular frame 60 from the rectangular frame 40. Since the outer periphery of the rectangular frame 40 is covered by the second rectangular frame 60, the secondary coil 30b wound around the groove in the outer periphery of the rectangular frame 40 does not have to be fixed in the groove by a molding material.

Referring to FIGS. 18A-18C and FIGS. 19A-19F, a fourth embodiment of this invention, pertaining to the configuration of the storage cell 36, will be described.

Referring to FIGS. 18A-18C, the storage cell 36 according to this embodiment includes the container 38 constituted by the rectangular frame 40 surrounding the storage element 37 and the pair of film bodies 41 adhered to either surface of the rectangular frame 40, similarly to the storage cell 36 according to the first embodiment. However, a groove is not formed in the outer periphery of the rectangular frame 40, and instead, the secondary self-resonant coil and the secondary coil 30b are formed integrally with one of the film bodies 41. It should be noted that the secondary self-resonant coil is not shown in the figures.

More specifically, the secondary self-resonant coil and the secondary coil 30b are formed in advance by printing patterns on respective electrical insulating films. The electrical insulating film formed with the secondary coil 30b is inserted in advance between two resin layers of the laminate film forming the film body 41, which is constituted by a plurality of resin layers having an electric insulation property. The electrical insulating film formed with the secondary self-resonant coil is inserted in advance between another two resin layers of the laminate film.

A bent portion 64 projecting to the outer side of the rectangular frame 40 is formed on one edge of the film body 41 into which the electrical insulating films are inserted. The printed pattern is set in advance such that respective ends of the secondary coil 30b are exposed to the bent portion 64.

The pair of electrode terminals 39 are insert-molded integrally with the rectangular frame 40 in advance. One end of each electrode terminal 39 projects to the outer side of the rectangular frame 40, and the other end projects to the inner side of the rectangular frame 40. The rectifying/charging control circuit board 31d is fixed to the outer periphery of the rectangular frame 40 between the pair of electrode terminals 39. The respective electrode terminals 39 are connected to the output terminal of the controller 31c on the rectifying/charging control circuit board 31d. The two ends of the secondary coil 30b exposed to the bent portion 64 are connected to the input terminal of the rectifier 31a on the rectifying/charging control circuit board 31d.

Referring to FIGS. 19A-19F, a manufacturing process for the storage cell 36 will now be described.

Figures 19A, 19B, 19C, 19D, 19E, 19F:
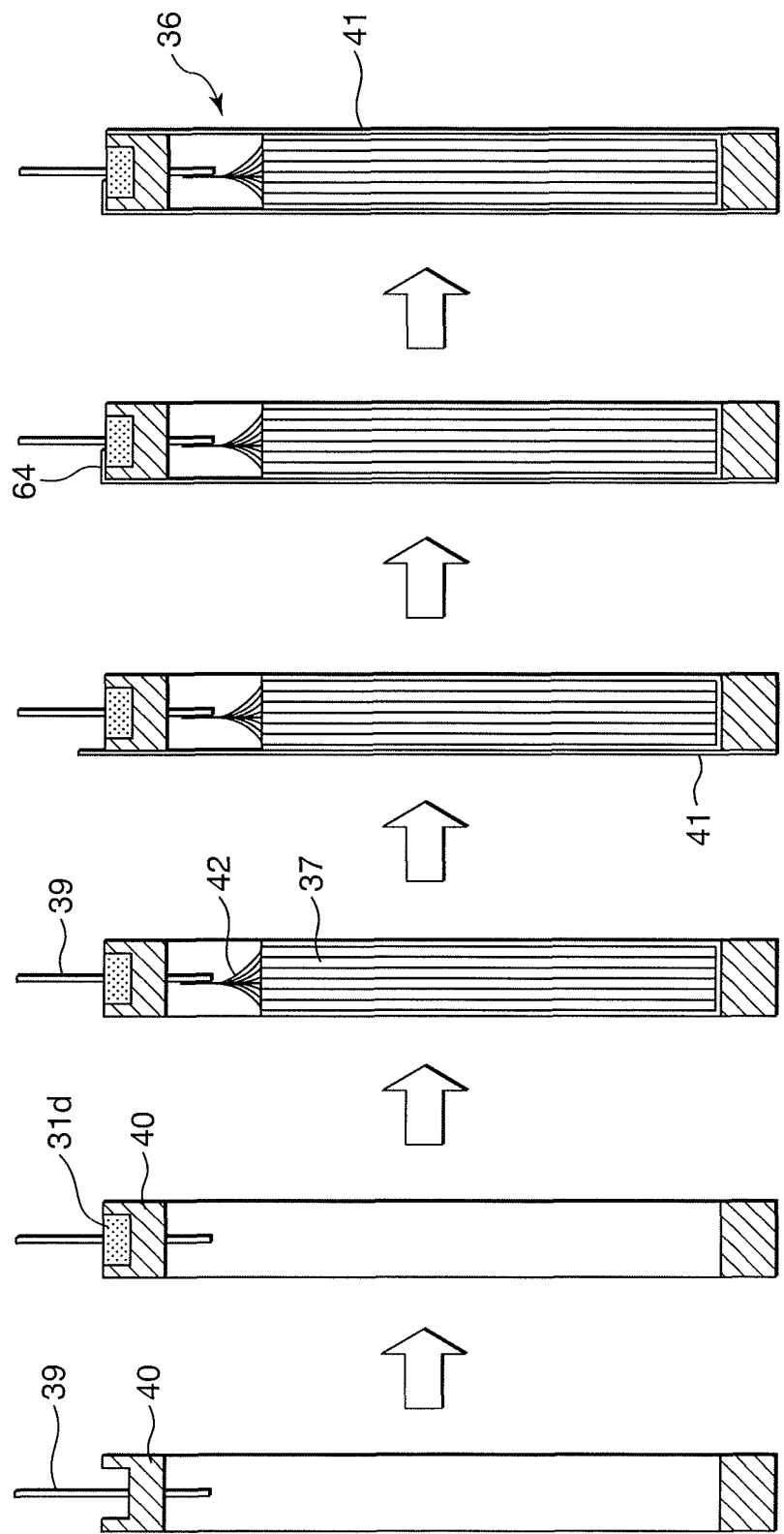
FIGS. 19A-19F are vertical sectional views of the storage cell according to the fourth embodiment of this invention, illustrating a process for manufacturing the storage cell.

As shown in FIG. 19A, the pair of electrode terminals 39 are insert-molded integrally with the rectangular frame 40 in advance. First, as shown in FIG. 19B, the rectifying/charging control circuit board 31d is attached to the outer periphery of the rectangular frame 40. The output terminal of the controller 31c on the rectifying/charging control circuit board 31d is then connected to the pair of electrode terminals 39.

Next, as shown in FIG. 19C, the storage element 37 is housed inside the rectangular frame 40, whereupon a bundled portion of the leads 42 having a corresponding polarity is joined to the pair of electrode terminals 39.

Next, as shown in FIG. 19D, the film body 41 in which the electrical insulating films pattern-printed with the secondary self-resonant coil and the secondary coil 30b are inserted between the resin layers is thermally bonded to one surface of the rectangular frame 40 by heat seal processing. As shown in FIG. 19E, the bent portion 64 is then bent such that the two ends of the secondary coil 30b exposed to the bent portion 64 are connected to the input terminal of the rectifier 31a on the rectifying/charging control circuit board 31d.

Finally, as shown in FIG. 19F, the other film body 41 is thermally bonded to the opposite side surface of the rectangular frame 40 by heat seal processing.

Through the processes described above, the storage cell 36 including the reception antenna 30 and the rectifying/charging control circuit board 31d can be manufactured easily and at low cost.

Referring to FIGS. 20A-20C, a fifth embodiment of this invention, pertaining to the configuration of the storage cell 36, will be described.

This embodiment is similar to the fourth embodiment. In this embodiment, however, the electrical insulating film pattern-printed with the secondary coil 30b is inserted between the resin layers of one film body 41 while the electrical insulating film pattern-printed with the secondary self-resonant coil 30a is inserted between the resin layers of the other film body 41. The bent portion 64 is formed on the film body 41 integrated with the secondary coil 30b, similarly to the fourth embodiment, such that the two ends of the secondary coil 30b are connected to the input terminal of the rectifier 31a on the rectifying/charging control circuit board 31d.

Likewise with this embodiment, the storage cell 36 including the reception antenna 30 and the rectifying/charging control circuit board 31d can be manufactured easily and at low cost.

Referring to FIGS. 21A-21C and FIG. 22, a sixth embodiment of this invention, pertaining to the configuration of the storage cell 36, will be described.

In this embodiment, the container 38 includes a pair of case members 38a and 38b formed from laminate films. The laminate films are made of similar materials to those used for the film bodies 41 of the first embodiment, i.e. films in which a plurality of resin films having an electric insulation property are laminated onto an intermediate layer made of metallic foil. The case members 38a and 38b include a recessed portion 38c and a flange portion 38d formed on a periphery of the recessed portion. The storage element is accommodated in the recessed portion 38c of either the case member 38a or the case member 38b. By thermally bonding the flange portions 38d to each other in this condition such that the recessed portions 38c oppose each other, the sealed container 38 housing the storage element is formed.

The pair of electrode terminals 39 are sandwiched between the flange portions 38d such that one end of each electrode terminal 39 projects to the outer side of the container 38. The homopolar leads 42 of the storage element 37 are bundled and connected to the electrode terminal 39 having the corresponding polarity inside the container 38.

As shown in FIG. 22, the secondary self-resonant coil 30a is formed in advance on one surface of an electrical insulating film 66 by pattern printing.

The secondary coil 30b is also formed on one surface of an electrical insulating film by pattern printing. The electrical insulating film formed with the secondary coil 30b is inserted in advance between resin layers of a laminate film in a site corresponding to a bottom portion of the recessed portion 38c in the case member 38a. The two ends of the secondary coil 30b are exposed to an outer surface of the case member 38a in the vicinity of the pair of electrode terminals 39.

The electrical insulating film 66 formed with the secondary self-resonant coil 30a is adhered to the bottom of the recessed portion 38c in the case member 38a in a position where the secondary self-resonant coil 30a overlaps the secondary coil 30b.

The rectifying/charging control circuit board 31d is fixed to the flange portion 38d of the case member 38a in the vicinity of the pair of electrode terminals 39. The input terminal of the rectifier on the rectifying/charging control circuit board 31d is connected to the two ends of the secondary coil 30b exposed to the outer surface of the case member 38a. The pair of electrode terminals 39 are connected to the output terminal of the charging control circuit on the rectifying/charging control circuit board 31d via a wire.

Likewise with this embodiment, the storage cell 36 including the reception antenna 30 and the rectifying/charging control circuit board 31d can be manufactured easily and at low cost.

Referring to FIGS. 23A, 23B, and FIG. 24, a seventh embodiment of this invention, pertaining to the configuration of the storage cell 36, will be described.

This embodiment is similar to the sixth embodiment. In this embodiment, the secondary self-resonant coil and the secondary coil 30b are formed in advance by printing patterns on respective electrical insulating films. The electrical insulating film formed with the secondary coil 30b and the electrical insulating film formed with the secondary self-resonant coil are laminated in advance via resin layers onto an inner side of a laminate film 67 constituted by a plurality of resin layers having an electric insulation property, shown in FIG. 24. One of the electrical insulating films may be adhered to a front surface of the laminate film 67.

The laminate film 67 in which the secondary self-resonant coil 30a and the secondary coil 30b are formed between the resin layers is adhered to an outer surface of the case member 38a corresponding to a rear side of the bottom portion of the recessed portion 38c. The two ends of the secondary coil 30b are exposed to an outer side of the laminate film 67 and connected to the input terminal of the rectifier on the rectifying/charging control circuit board 31d.

The rectifying/charging control circuit board 31d is attached to an upper edge of a peripheral edge portion of the container 38, and the pair of electrode terminals 39 are connected to the output terminal of the controller 31c on the rectifying/charging control circuit board 31d via a wire.

Likewise with this embodiment, the storage cell 36 including the reception antenna 30 and the rectifying/charging control circuit board 31d can be manufactured easily and at low cost.

Referring to FIGS. 25, 26, 27A-27C, and FIGS. 28A and 28B, an eighth embodiment of this invention, pertaining to the configuration of the storage cell 36, will be described.

Figure 25:
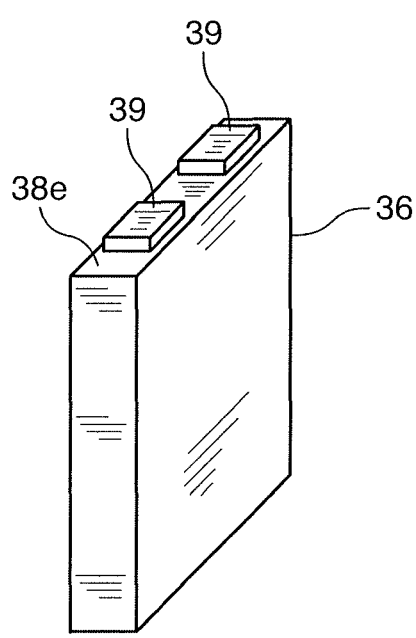
FIG. 25 is a perspective view of a storage cell according to an eighth embodiment of this invention.
Figure 26:
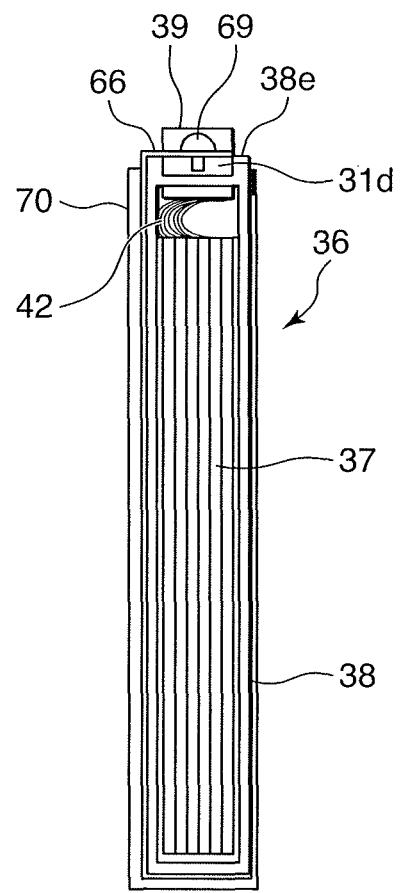
FIG. 26 is a vertical sectional view of the storage cell according to the eighth embodiment of this invention.

Referring to FIGS. 25 and 26, in this embodiment, the container 38 is constituted by a metallic hard case. The storage element 37 is housed in the container 38 and sealed by a lid portion 38e on which the pair of electrode terminals 39 are disposed. The homopolar leads 42 of the storage element 37 are bundled and connected to the electrode terminal 39 having the corresponding polarity in the interior of the container 38. To prevent charge leakage and short circuits, insulation processing is implemented on the metallic container 38.

The rectifying/charging control circuit board 31d is fixed to a rear surface of the lid portion 38e facing the interior of the container 38. The input terminal of the rectifier 31a on the rectifying/charging control circuit board 31d is provided on an outer side of the lid portion 38e. The output terminal of the controller 31c on the rectifying/charging control circuit board 31d is connected to the pair of electrode terminals 39.

Referring to FIGS. 28A and 28B, the secondary self-resonant coil 30a and the secondary coil 30b are formed in advance on one surface of an electrical insulating film 66 by pattern printing so as not to interfere with each other. An opposite side surface of the electrical insulating film 66 to the pattern-printed surface is adhered to an outer surface of the container 38. The bent portion 64 is formed on the electrical insulating film 66, similarly to the fourth embodiment. The two ends of the secondary coil 30b are connected to the input terminal of the rectifier on the rectifying/charging control circuit board 31d via a screw 69.

Referring to FIGS. 27A-27C, in this condition, the container 38 is inserted into a bag 70 constituted by a heat-shrinkable material, and by heat-shrinking the bag 70, the printed patterns of the secondary self-resonant coil 30a and the secondary coil 30b are fixed and electrically insulated. A bottomless tubular heat-shrinkable material may be used instead of the bag 70.

The bag 70 made of the heat-shrinkable material may also be applied to the storage cell 36 according to the sixth embodiment or the seventh embodiment.

Likewise with this embodiment, the storage cell 36 including the reception antenna 30 and the rectifying/charging control circuit board 31d can be manufactured easily and at low cost.

In the respective embodiments described above, an electric double layer capacitor is used as the storage element 37. However, this invention may also be applied to a storage apparatus in which a secondary battery such as a nickel hydrogen battery or a lithium ion battery, or another type of storage battery, is used as the storage element 37.

Likewise in a case where a secondary battery is used as the storage element 37, when a storage apparatus is constructed by combining a plurality of storage elements in series or in parallel, it is difficult to suppress unevenness in the SOC of the individual secondary batteries. In this invention, the SOC is determined for each individual storage cell 36 and charging is performed individually and concurrently in accordance with the SOC. Therefore, unevenness in the SOC of the individual secondary batteries can be equalized during the charging processing such that all of the storage elements 37 can be charged to the vicinity of the full charge amount. Hence, likewise when a secondary battery is used as the storage element 37, a favorable effect in terms of preventing over-discharging and overcharging is obtained by applying this invention.

Figure 29:
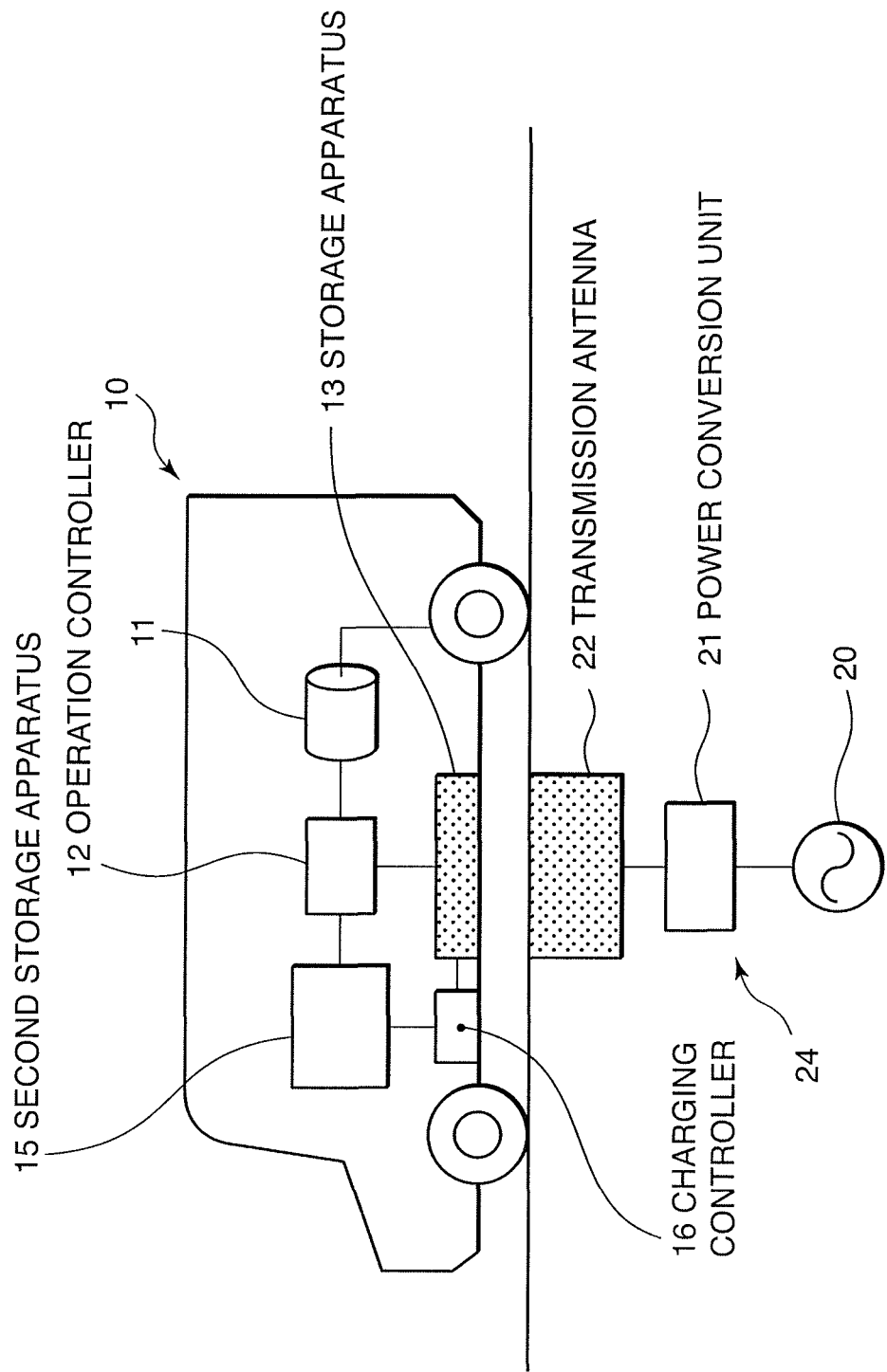
FIG. 29 is a schematic diagram of another wireless power transfer system for a vehicle to which this invention can be applied.

Referring to FIG. 29, a variation of the wireless power transfer system for a vehicle to which the storage apparatus 13 according to this invention can be applied will be described.

The electric automobile 10 includes, in addition to the configuration of the electric automobile 10 according to the first embodiment, a second storage apparatus 15 and a charging controller 16 that controls the supply of power from the first storage apparatus 13 to the second storage apparatus 15.

Similarly to the first embodiment, the first storage apparatus 13 includes a plurality of storage cells constituted by electric double layer capacitors into which a reception antenna and a charging control circuit are inbuilt. The second storage apparatus 15 includes storage cells constituted by pre-existing secondary batteries such as nickel hydrogen batteries or lithium ion batteries. The charging controller 16 performs control relating to the transfer of power charged in the first storage apparatus 13 to the second storage apparatus 15.

Power transmitted from the transmission antenna 22 of the feeding facility 24, which is constituted similarly to the first embodiment, is transferred to each storage cell of the first storage apparatus 13. In an active condition, the charging controller 16 transfers power from the first storage apparatus 13 to each storage cell of the second storage apparatus 15.

The first storage apparatus 13 temporarily stores the power received by the respective storage cells including the reception antenna. The second storage apparatus 15 stores the power transferred from the first storage apparatus 13.

By combining the first storage apparatus 13 using electric double layer capacitors that are capable of rapid charging in units of several seconds with the second storage apparatus 15 constituted by secondary batteries such as nickel hydrogen batteries or a lithium ion batteries having high energy density in this manner, a distance that can be traveled by the electric automobile 10 without receiving power can be extended.

Figure 30:
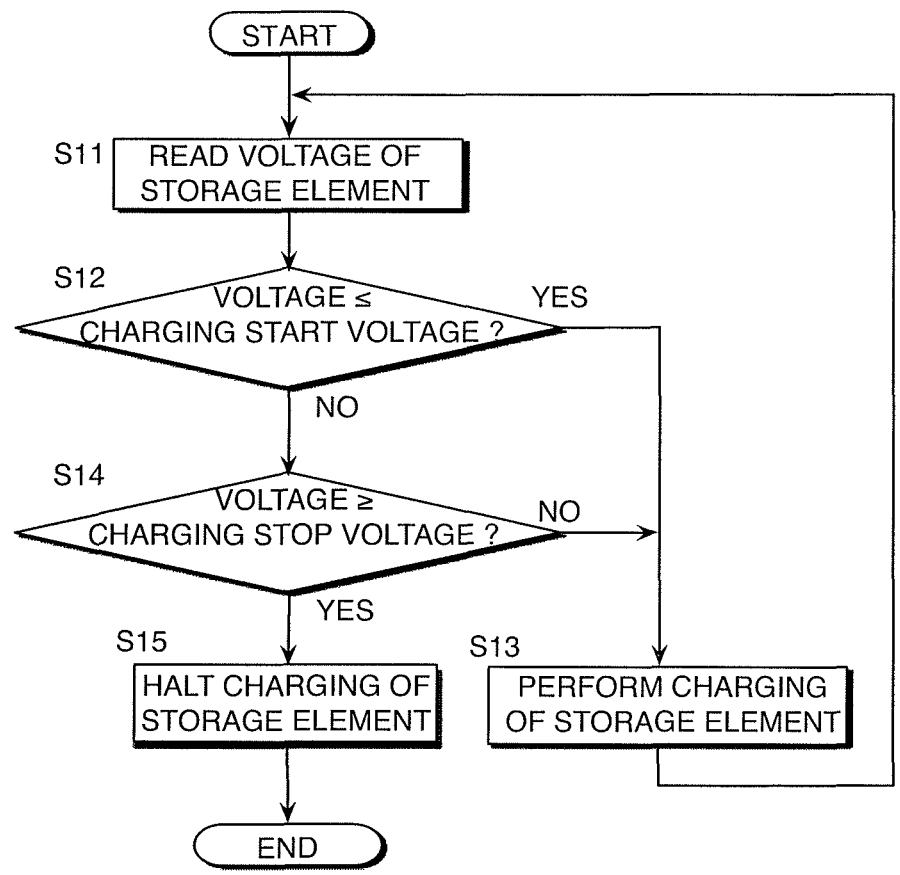
FIG. 30 is a flowchart illustrating a charging control routine according to a ninth embodiment of this invention.

Referring to FIG. 30, a ninth embodiment of this invention, pertaining to the charging control routine, will be described.

In this embodiment, the storage cell 36 includes a cell voltage sensor that detects a voltage of the storage element 37 instead of the SOC sensor 31b. The controller 31c charges the storage apparatus 13 using power supplied from the feeding facility 24 by executing a charging control routine shown in FIG. 30 instead of the charging control routine shown in FIG. 4.

The charging control routine of FIG. 4 may be applied to both a case in which an electric double layer capacitor is used as the storage element 37 and a case in which a secondary battery is used. However, this routine is applied only to a case in which an electric double layer capacitor is used as the storage element 37. It is difficult to detect a storage level of a secondary battery from the voltage alone due to a discharge characteristic thereof. In an electric double layer capacitor, on the other hand, the state of charge and the voltage have a comparatively linear relationship, and therefore the state of charge can be determined from the voltage of the storage element 37.

Similarly to the charging control routine of FIG. 4, this charging control routine is executed only once by the controller 31c when the electric automobile 10 is stopped in the predetermined feeding position, using the charging command signal output to the charging control circuit 31 of each storage cell 36 by the operation controller 12 as a trigger.

The controller 31c is provided in each storage cell 36, and therefore the controller 31c of each storage cell 36 executes this routine in relation to charging of the storage element 37 in the storage cell 36.

In a step S11, the controller 31c reads the voltage of the storage element 37, detected by the cell voltage sensor.

In a step S12, the controller 31c determines whether or not the voltage of the storage element 37 is equal to or lower than a charging start voltage. The charging start voltage is set at 1.0 volt (V), for example.

When the determination of the step S12 is affirmative, the controller 31c charges the storage element 37 using the direct current output by the rectifier 31a in a step S13. Following the processing of the step S13, the controller 31c executes the processing of the step S11 onward again. When the determination of the step S12 is negative, the controller 31c determines in a step S14 whether or not the voltage of the storage element 37 is equal to or higher than a charging stop voltage. The charging stop voltage is set at 3.0V, for example.

When the determination of the step S14 is negative, the controller 31c charges the storage element 37 in the step S13 and then executes the processing of the step S11 onward again.

When the determination of the step S14 is affirmative, the controller 31c blocks the direct current output from the rectifier 31a to the storage element 37 in a step S15 so as to halt charging of the storage element 37. Following the processing of the step S15, the controller 31c terminates the routine.

Likewise in this charging control routine, the voltage of the storage element 37 is determined for each individual storage cell 36 and the storage elements 37 are charged individually and concurrently in accordance with the voltage. Hence, an initializing function for equalizing the charged amounts of the respective storage elements 37 is provided, thereby eliminating the need to provide a separate equalizing circuit.

The contents of Tokugan 2009-237051, with a filing date of Oct. 14, 2009 in Japan, are hereby incorporated by reference. Although the invention has been described above with reference to certain embodiments, the invention is not limited to the embodiments described above. Modifications and variations of the embodiments described above will occur to those skilled in the art, within the scope of the claims.

For example, in the embodiments described above, each individual storage cell 36 includes the controller 31c such that the charging control routine shown in FIG. 4 or FIG. 30 is executed individually. However, a single controller 31c may be provided for a cell group constituted by a plurality of storage cells 36 such that the controllers 31c execute the charging control routine concurrently on the storage elements 37 in the cell groups.

The storage apparatus and storage cell according to this invention are not limited to use in an electric automobile, and may be applied as various types of power supply employing a wireless power transfer system.

INDUSTRIAL FIELD OF APPLICATION

As described above, the storage apparatus according to this invention exhibits particularly favorable effects when used as a reception facility of a wireless power transfer system for an electric automobile.

The embodiments of this invention in which an exclusive property or privilege is claimed are defined as follows:

1. A storage apparatus configured to store power transferred from a feeding facility via a wireless power transfer system, the storage apparatus comprising:
   a plurality of storage cells connected in series or in parallel, wherein each storage cell of the plurality of storage cells comprises:
      a storage element configured to store a charge;
      a container that houses the storage element;
      a reception antenna configured to receive power transmitted by the wireless power transfer system; and
      a charging control circuit configured to charge the storage element using the power received by the reception antenna, wherein the reception antenna and the charging control circuit are mounted on and carried by the container,
   wherein the feeding facility comprises a transmission antenna including:
      a primary coil configured to receive high-frequency power, and
      a primary self-resonant coil configured to be coupled to the primary coil by electromagnetic induction,
   wherein the reception antenna comprises:
      a secondary self-resonant coil configured to be coupled to the primary self-resonant coil by magnetic field resonance, and
      a secondary coil configured to be coupled to the secondary self-resonant coil by electromagnetic induction, and
   wherein the container comprises:
      a rectangular frame that surrounds the storage element; and
      a film body adhered to respective surfaces of the rectangular frame, wherein the reception antenna is wound around the rectangular frame.

2. The storage apparatus as defined in claim 1, wherein the rectangular frame comprises:
   a first rectangular frame that surrounds the storage element; and
   a second rectangular frame that surrounds the first rectangular frame, wherein the reception antenna is wound around the second rectangular frame.

3. The storage apparatus as defined claim 1, wherein the rectangular frame comprises:
   a first rectangular frame surrounding the storage element; and
   a second rectangular frame surrounding the first rectangular frame,
   wherein the secondary coil is wound around the first rectangular frame, and the secondary self-resonant coil is wound around the second rectangular frame.

4. A storage apparatus configured to store power transferred from a feeding facility via a wireless power transfer system, the storage apparatus comprising:
   a plurality of storage cells connected in series or in parallel, wherein each storage cell of the plurality of storage cells comprises:
      a storage element configured to store a charge;
      a container that houses the storage element;
      a reception antenna configured to receive power transmitted by the wireless power transfer system; and
      a charging control circuit configured to charge the storage element using the power received by the reception antenna, wherein the reception antenna and the charging control circuit are mounted on and carried by the container,
   wherein the feeding facility comprises a transmission antenna including:
      a primary coil configured to receive high-frequency power, and
      a primary self-resonant coil configured to be coupled to the primary coil by electromagnetic induction,
   wherein the reception antenna comprises:
      a secondary self-resonant coil configured to be coupled to the primary self-resonant coil by magnetic field resonance, and
      a secondary coil configured to be coupled to the secondary self-resonant coil by electromagnetic induction, and
   wherein the container comprises:
      a rectangular frame that surrounds the storage element; and
      a film body adhered to respective surfaces of the rectangular frame, wherein the reception antenna is incorporated into the film body.

5. The storage apparatus as defined in claim 4, wherein the film body comprises a laminate sheet of resin layers having an electric insulation property and laminated to each other, and
the reception antenna is pattern-printed onto an electrical insulating film inserted between the resin layers of the film body.

6. The storage apparatus as defined in claim 4, wherein:
the film body comprises a pair of film bodies adhered to respective surfaces of the rectangular frame, and
the secondary self-resonant coil is incorporated into one of the film bodies, and the secondary coil is incorporated into the other film body.

* * * * *